(12) United States Patent
Vasu

(10) Patent No.: US 12,249,140 B1
(45) Date of Patent: Mar. 11, 2025

(54) APPLICATION OF VISION ALPHABETS FOR SEARCHING AND INDEXING

(71) Applicant: Spotacle, Inc, Bellevue, WA (US)

(72) Inventor: Niranjan Vasu, Sammamish, WA (US)

( * ) Notice: Subject to any disclaimer, the term of this patent is extended or adjusted under 35 U.S.C. 154(b) by 381 days.

(21) Appl. No.: 17/510,376

(22) Filed: Oct. 25, 2021

Related U.S. Application Data

(60) Provisional application No. 63/105,163, filed on Oct. 23, 2020.

(51) Int. Cl.
*G06K 9/00* (2022.01)
*G06F 16/732* (2019.01)
*G06F 16/783* (2019.01)
*G06N 3/04* (2023.01)
*G06T 1/00* (2006.01)
(Continued)

(52) U.S. Cl.
CPC .......... *G06V 20/20* (2022.01); *G06F 16/7328* (2019.01); *G06F 16/7837* (2019.01); *G06N 3/04* (2013.01); *G06T 1/0014* (2013.01); *G06V 30/416* (2022.01)

(58) Field of Classification Search
CPC .. G06V 20/20; G06V 30/416; G06F 16/7328; G06F 16/7837; G06N 3/04; G06T 1/0014
See application file for complete search history.

(56) References Cited

U.S. PATENT DOCUMENTS

2010/0033503 A1* 2/2010 Baar .................... G06F 3/04842 345/647
2010/0198700 A1* 8/2010 Ramaswamy ..... G06Q 30/0601 705/26.1

(Continued)

FOREIGN PATENT DOCUMENTS

EP 3388999 A1 * 10/2018
GB 2533759 A * 7/2016 ......... G06F 17/3028
(Continued)

OTHER PUBLICATIONS

An End-To-End Deep Neural Architecture for Optical Character Verification and Recognition in Retail Food Packaging, Fabio De Soussa et al., IEEE, 2018, pp. 2376-2380 (Year: 2018).*

(Continued)

*Primary Examiner* — Jayesh A Patel
(74) *Attorney, Agent, or Firm* — Compass IP Law PC

(57) ABSTRACT

A computing system can perform computer-vision-based operations to create a vision-based user environment. The system can process an image stream and identify a computer vision character of a vision alphabet in the image stream. The vision alphabet includes a collection of computer vision characters, with each computer vision character having a distinctive characteristic identifiable by computer vision. The system can process an image of the video stream to provide to a user device a function associated with the identified computer vision character, the processing including to make a bounded space within the video stream corresponding to the identified computer vision character interactive on the user device. The system can provide the function in response to interaction with the bounded space at the user device. The system can provide a processed image to the user device, or simply provide functionality for a received stream.

26 Claims, 15 Drawing Sheets

(51) Int. Cl.
 *G06V 20/20* (2022.01)
 *G06V 30/416* (2022.01)

(56) References Cited

U.S. PATENT DOCUMENTS

| | | | | |
|---|---|---|---|---|
| 2016/0180467 | A1* | 6/2016 | Griffin | G06F 16/7837 |
| | | | | 705/4 |
| 2017/0286773 | A1* | 10/2017 | Skaff | G06N 3/008 |
| 2017/0289643 | A1* | 10/2017 | Kachkova | H04N 21/6587 |
| 2018/0121721 | A1* | 5/2018 | García | G06V 20/10 |
| 2018/0166046 | A1* | 6/2018 | Yamazaki | G06Q 30/02 |
| 2019/0149725 | A1* | 5/2019 | Adato | H04N 1/00 |
| | | | | 348/158 |
| 2020/0074402 | A1* | 3/2020 | Adato | G06V 20/52 |
| 2020/0279113 | A1* | 9/2020 | Yanagi | B65G 1/1371 |
| 2021/0012686 | A1* | 1/2021 | Chiu | G09F 3/208 |
| 2022/0405321 | A1* | 12/2022 | Morate | G06F 16/5854 |
| 2023/0252407 | A1* | 8/2023 | Kim | A47F 1/08 |
| | | | | 705/28 |

FOREIGN PATENT DOCUMENTS

| | | | | | |
|---|---|---|---|---|---|
| JP | | 20117622 A | * | 4/2011 | |
| WO | WO-2009027836 A2 | | * | 3/2009 | ......... G06K 9/00664 |

OTHER PUBLICATIONS

LabelMe: A Database and Web-Based Tool for Image Annotation, Bryan C. Russell et al., Springer, 2008, pp. 157-173 (Year: 2008).*
Searching for Images and Videos on the World-Wide Web, John R Smith et al., Aug. 1996, pp. 1-19 (Year: 1996).*

* cited by examiner

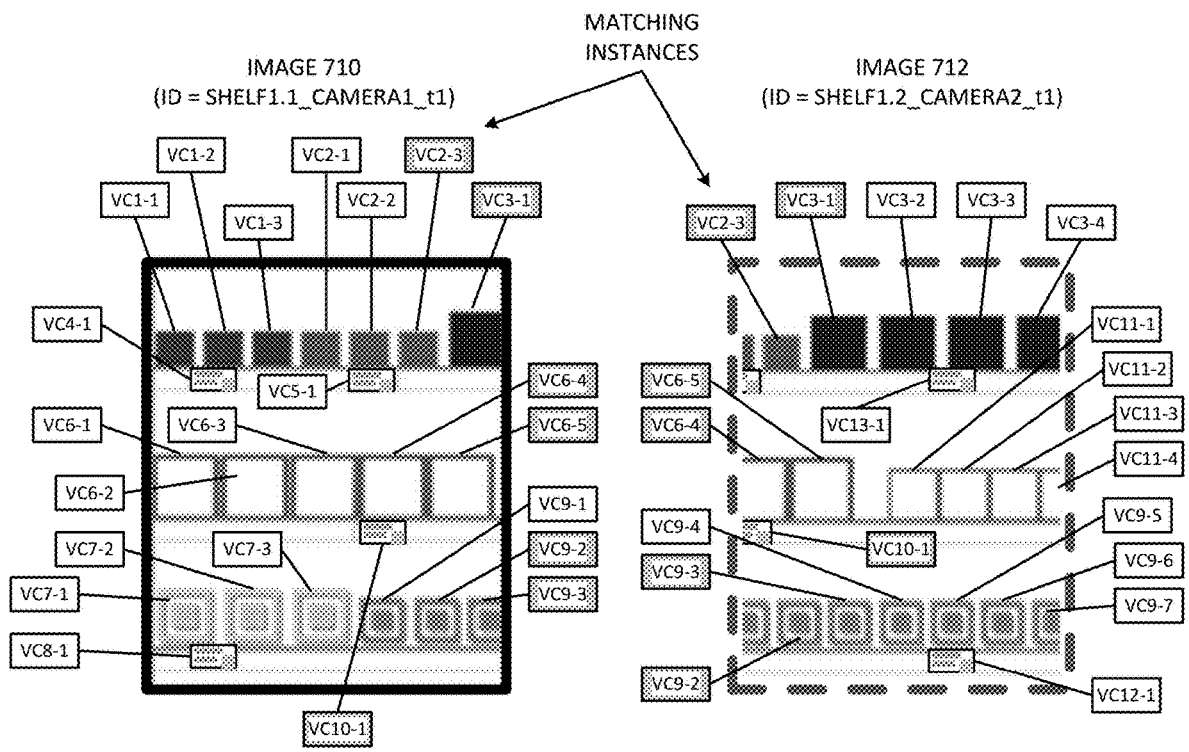

FIG. 7D

TABLE 770

| Image_ID | Time | VC_ID | VC_Type | VC Location* in Image | Instance_IDs |
|---|---|---|---|---|---|
| Shelf1.1_Camera1_t1 | t1 | VC1 | PRODUCT | L1, L2, L3 | VC1-1, VC1-2, VC1-3 (3 INSTANCES) |
| | | VC2 | PRODUCT | L4, L5, L6 | VC2-1, VC2-2, VC2-3 (3 INSTANCES) |
| | | VC3 | PRODUCT | L7 | VC3-1 (1 INSTANCE) |
| | | VC4 | LABEL | L8 | VC4-1 (1 INSTANCE) |
| | | VC5 | LABEL | L9 | VC5-1 (1 INSTANCE) |
| | | VC6 | PRODUCT | L10, L11, L12, L13, L14 | VC6-1, VC6-2, VC6-3, VC6-4, VC6-5 (5 INSTANCES) |
| | | VC7 | PRODUCT | L15, L16, L17 | VC7-1, VC7-2, VC7-3 (3 INSTANCES) |
| | | VC8 | LABEL | L18 | VC8-1 (1 INSTANCE) |
| | | VC9 | PRODUCT | L19 | VC9-1, VC9-2, VC9-3 (3 INSTANCES) |
| | | VC10 | LABEL | L20 | VC10-1 (1 INSTANCE) |
| Shelf1.2_Camera2_t1 | t1 | VC2 | PRODUCT | L1' | VC2-3 (1 INSTANCE) |
| | | VC3 | PRODUCT | L2', L3', L4', L5' | VC3-1, VC3-2, VC3-3, VC3-4 (4 INSTANCES) |
| | | VC6 | PRODUCT | L6', L7' | VC6-4, VC6-5 (2 INSTANCES) |
| | | VC9 | PRODUCT | L8', L9', L10', L11', L12' | VC9-2, VC9-3, VC9-4, VC9-5, VC9-6, VC9-7 (6 INSTANCES) |
| | | VC10 | LABEL | L13' | VC10-1 (1 INSTANCE) |
| | | VC11 | PRODUCT | L14', L15', L16', L17' | VC11-1, VC11-2, VC11-3, VC11-4 (4 INSTANCES) |
| | | VC12 | LABEL | L18' | VC12-1 (1 INSTANCE) |
| | | VC13 | LABEL | L19' | VC13-1 (1 INSTANCE) |

*VC LOCATION CAN BE EXPRESSED AS COORDINATES OF CENTROID OF THE BOUNDING BOX FOR A DETECTED VC

FIG. 7E

APPLICATION OF VISION ALPHABETS FOR SEARCHING AND INDEXING

RELATED APPLICATIONS

This application is a nonprovisional application based on, and claims priority to, U.S. Provisional Application No. 63/105,163 filed Oct. 23, 2020. That provisional application is incorporated herein by reference.

FIELD

Descriptions are generally related to computer vision systems, and more particular descriptions are related to image indexing based on computer object recognition.

BACKGROUND

Indexing and searching has been refined over years to find information on the internet or in vast databases. Traditional indexing is directed to text-based approaches, where the indexing is performed based on textual information. There are many powerful search engines for textual information. Image searching is relatively unrefined compared to text-based searching. Most image searching is performed based on textual tags or metadata.

BRIEF DESCRIPTION OF THE DRAWINGS

The following description includes discussion of figures having illustrations given by way of example of an implementation. The drawings should be understood by way of example, and not by way of limitation. As used herein, references to one or more examples are to be understood as describing a particular feature, structure, or characteristic included in at least one implementation of the invention. Phrases such as "in one example" or "in an alternative example" appearing herein provide examples of implementations of the invention, and do not necessarily all refer to the same implementation. However, they are also not necessarily mutually exclusive.

FIG. 7D represents an example of instance identification.

FIG. 7E represents an example of applying Instance_ID generation to indexing.

Figure 1:
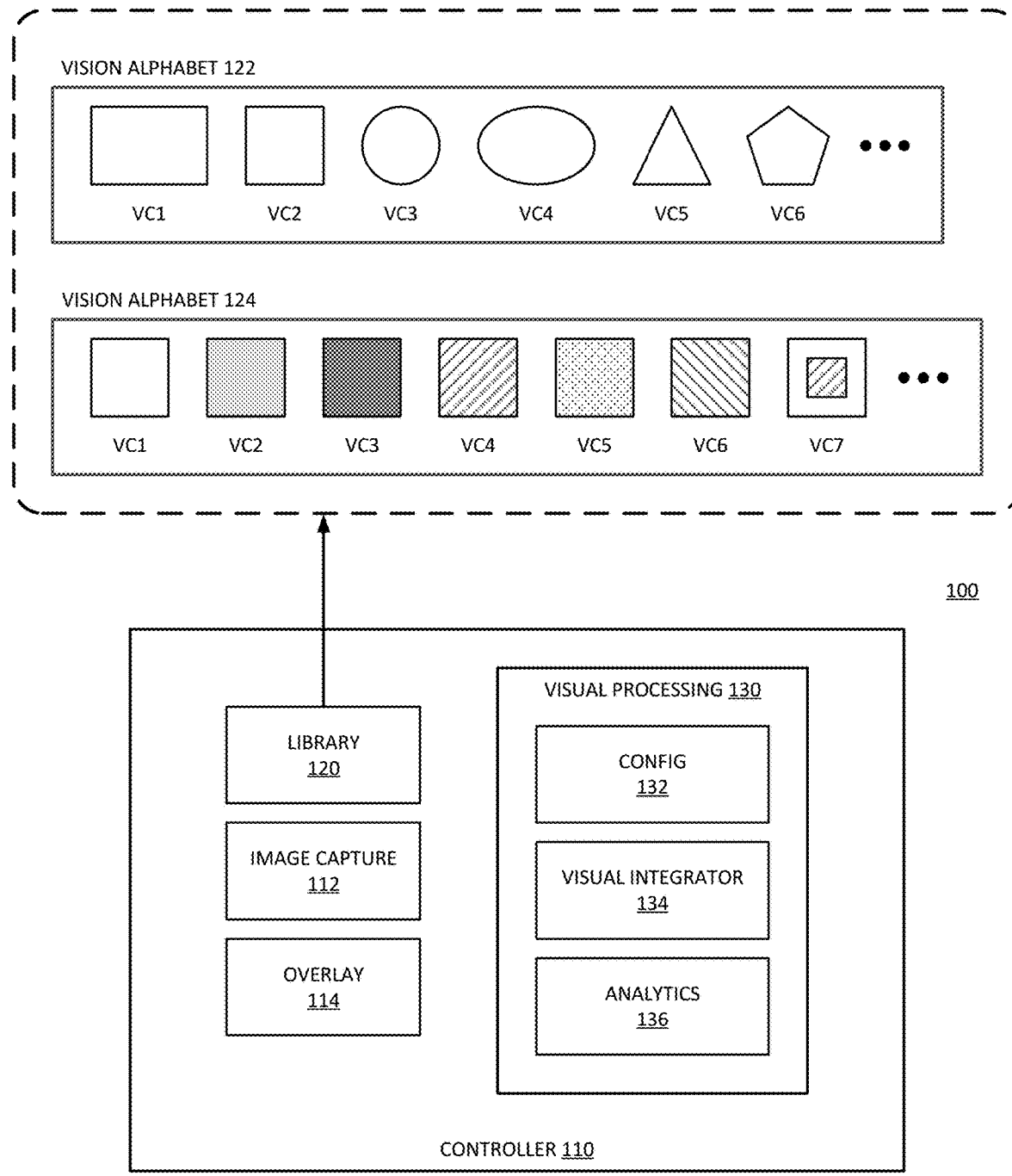
FIG. 1 is a block diagram of an example of a system that performs visual processing based on a vision alphabet.

Descriptions of certain details and implementations follow, including non-limiting descriptions of the figures, which may depict some or all examples, and well as other potential implementations.

DETAILED DESCRIPTION

As described herein, a system performs searching and indexing based on vision alphabets, which include elements that are computer-vision based, and are more complex than single pixels or groups of pixels. The vision alphabet can be made up of computer vision characters (or simply, vision characters), referring to elements of an image that are individually recognizable by a computer vision system, such as a neural network, artificial intelligence system, or other automated vision-based detection system. The vision characters can be referred to as vision objects, referring to individual elements recognizable by the system within an image. The image can be an image taken by a camera or images of a screen of a personal computing device. The system can build a vision object index from identification of the objects. The system can be trained on what objects to identify. The identifiable objects can be referred to as the vision alphabet. In one example, the system can also identify new objects to add to the vision alphabet, which objects can then be included in the vision object index.

The system can capture a video stream and identify one or more vision objects in the video stream. The system can re-render the video stream to send to a user device, including providing features in the stream to enable an end user of the video stream to select identified vision objects or vision characters from the video stream.

Selection of the vision objects through selection of a bounded region within the frame associated with the vision object can provide functionality associated with the selected vision object to the user device. For example, selection can load additional information about the vision object or execute a function represented by the vision object or a function associated with the vision object.

While there may be applications in many domains, the descriptions below focus on two domains for the application of vision alphabets and vision object indexes: retail shelving and computer screen workspaces. It will be understood that the descriptions are merely examples of how the principles can be applied, and are not limiting on the types of applications that can be performed with vision alphabets. A system applying vision alphabets can provide a scalable way to extract visual information from an image, as well as providing an efficient way to represent and organize the visual information that is fragmented across a large number of images across multiple streams of images (referred to as image streams). Such a system enables new scenarios around discovery, organization, information consumption, and scalable collaboration.

As mentioned above, vison alphabets can enable new experiences in vision-centric scenarios in different domains where image-streams are generated. In any of the domains, fundamentally, the application of the vision alphabet includes processing video information to identify elements or objects with the visual index that represents the vision alphabet. In response to identification of the elements, the system enables vision information to be interactive to a user device or user system that receives the video stream. The interactive capabilities enable user interaction to accomplish outcomes in the context of the specific domain that are traditionally unachievable.

In many vision-centric scenarios (e.g., screen sharing, retail systems), visual information capture systems (like cameras or shared screens) can generate streams of images (image streams) of large structured composite objects. A structured composite object refers to an object that has clear and identifiable visual structure, and which is made up of smaller vision objects. For example, a retail shelf is typically a rectangular region that includes many items/products. As another example, a worksheet is a rectangular region composed of cells. As another example, a web page is a region having a URL (uniform resource locator or universal resource locator) and hyperlinks. As another example, a text document is a rectangular region having blocks of text. In such vision-centric scenarios, an image stream can contain a whole view, or more commonly, a partial view, of the larger composite object.

FIG. 1 is a block diagram of an example of a system that performs visual processing based on a vision alphabet. System 100 represents a system for computer vision that can provide vision-based user experiences. The vision-based user experiences refer to vision-centric scenarios generated by a computer vision system that can recognize objects in video streams and generate an interactive user environment based on the recognition of the objects.

In general, vision-centric scenarios refer to scenarios in which a person would process visual information related to the visual structure, layout, pattern, or objects of images. The information can be provided as image streams or video streams to a user. In general, a video stream will be used to refer to a sequence of images that are streamed. The sequence of images from a single camera will typically be a selected view, where the sequence of images represents a change over time. A sequence of images could also depict a change in view or location being viewed, as well as a change in time.

In many scenarios, there are a large number of images across multiple streams of images (image streams) capturing different visual information. Even in a single image stream, visual information tends to change over time, and each image captures a snapshot in time. Visual information is thus fragmented across images in a single image-stream, as well as across multiple image streams.

The application of vision alphabets provides a scalable way to not only extract the visual information from a single image, but also an efficient way to represent and organize the visual information that is fragmented across a large number of images across multiple image streams. As such, a system that applies vision alphabets enables new scenarios around discovery, organization, information consumption, and scalable collaboration.

The following descriptions refer extensively to retail and screen-sharing related examples. However, it will be understood that the application of vision alphabets applies generally to any structured composite object, physical space, or region of interest (ROI). In addition to retail and shared workspaces, vision alphabets can be applied to scenarios including warehouses, cargo/container storage, identification of geo-spatial regions (e.g., land areas with building, roads, or other structures), or other scenarios.

System 100 includes controller 110, which represents a computer system or a controller executing on the computer system. The computer system can be local to the device that generates the video stream, within a common local area network (LAN) as the device that generates the video stream, or be remote from the device that generates the video stream. A computer system remote from the device that generates the video stream is connected over a wide area network (WAN), such as the Internet (e.g., a cloud service provider system accessible over the Internet).

In one example, controller 110 includes image capture 112. Image capture 112 can represent an image capture device or image capture scenario, when controller 110 is local to the device that generates the video stream. When controller 110 is remote, image capture 112 represents a path to receive image data from the device that generates the video stream.

Overlay 114 represents the capability of controller 110 to generate interactive elements to overlay over the video stream to enable a user to interact with objects identified by the computer vision system. Visual processing 130 represents the computer vision processing for controller 110. Visual processing 130 receives image information from image capture 112 and performs processing to detect objects.

Controller 110 includes library 120, which represents a library of information stored locally to controller 110, or represents a library of information accessible to controller 110 over a network. Library 120 includes one or more vision alphabets. Vision Alphabets (VAs) refer to components of structured composite objects that can be visually detected in an image of the structured composite object. In one example, vision alphabets are specific to a specific visual domain. For example, the vision alphabet for a retail store shelf can be a different alphabet than the vision alphabet for a shared screen workspace or other computer screen workspace. The vision alphabets for both examples could have similarities with, and differences to, for example, a vision alphabet for a warehouse domain.

A Vision Alphabet (VA) can be thought of as a collection or set of vision objects with particular characteristics. The VA includes multiple elements, where each element of the VA is a vision object or a visual object, which at a high level corresponds to, but is different from a character of a traditional text alphabet. This elemental vision object can be referred to as a Vision Character (VC), where a VA is a collection of VCs. A composite object includes multiple VA elements, or multiple VCs, to make up a screen space having multiple recognizable vision objects from the VA.

A VA may be understood by considering them analogous to text characters or traditional alphabets in a language. However, there are significant differences in their construction, technology to identify them, their representation, and their application. Consider a set of traditional text alphabets in a written language, which includes characters that be placed in a group to represent a word. Similarly, visual images that represent Vision Characters (VCs) can be grouped to form a composite object.

System 100 illustrates vision alphabet 122, which includes at least vision characters VC1, VC2, VC3, VC4, VC5, and VC6. The VCs of vision alphabet 122 can be based on, and thus, distinguished by, shape. VC1 represents a rectangular shape, VC2 represents a square shape, VC3 represents a circular shape, VC4 represents an elliptical shape, VC5 represents a triangular shape, and VC6 represents a pentagonal shape.

System 100 illustrates vision alphabet 124, which includes at least vision characters VC1, VC2, VC3, VC4, VC5, VC6, and VC7. The VCs of vision alphabet 124 can be based on, and thus, distinguished by, color or texture or image type. All VCs VC [1:7] have a square shape that can be the same or similar in size. VC1 has a white color, VC2 has a light gray color, VC3 has a dark gray color, VC4 has a hatching pattern with lines that rise to the right, VC5 has a dotted hatch pattern, VC6 has a hatching pattern with lines that lower to the right, and VC7 has a square cross-hatched portion with a white border.

A vision alphabet can include vision characters distinguishable by any type or combination of characteristics, including, but not limited to, shape, size, color, texture, graphic/label, or other characteristic, or a combination of characteristics. The possible combinations of vision characters and vision alphabets is not limited, and can be any feature or characteristic identifiable by a computer vision system—to identify one object from another with a high degree of confidence.

System 100 can apply one or both vision alphabet 122 and vision alphabet 124 (or other VA not specifically illustrated) to video streams or image streams to process the image information into an index of VCs from the VA. The index includes vision objects identified in the image stream, which can make up an index for visual searching and matching. In one example, a trained computer system, such as an AI (artificial intelligence) system can be programmed to recognize the VCs, which allows the system to detect vision objects in an image stream and index the information. Based on identification and indexing of the vision objects, the system can associate functionality with the objects within the image.

In one example, visual processing 130 includes configuration (CONFIG) 132 to configure visual processing 130. Configuration 132 can include AI training, the setting of configuration parameters for object identification, identification of information to ignore from object identification, or other configuration.

Visual integrator 134 represents the capability of visual processing 130 to integrate video information with vision alphabets. Visual integrator 134 can integrate different views or different streams of video or image capture and identify specific object instances and specific characteristics of the image or video. Such integration of different images can be referred to as stitching video information or stitching image information. In contrast to traditional stitching, controller 110 can recognize specific objects and generate an interactive video environment or interactive streaming environment based on recognized objects.

Analytics 136 represents the ability of visual processing 130 to analyze the video information for objects based on the library of vision alphabets. Based on vision characters in the vision alphabet(s), analytics 136 can generate information to identify specific instances of characters. For example, for repetition of an object type in the image stream, analytics 136 can identify specific instances of the object, to create a map of the image information.

In one example of a retail visual domain ("retail domain"), library 120 includes a VA with items or products as the components or vision characters, with the shelf being a composite object. In one example of a shared workspace visual domain (a "documents domain"), library 120 can include a VA with paragraph components that make up a document composite object. It will be understood that within a traditional character alphabet there can be different classes of characters, which could be understood as different alphabet types within the alphabet; for example, traditional Roman characters include consonants, vowels, and punctuation marks. Similarly, a VA can include different classes of VCs or different vision alphabet types within a VA, which can again vary from one domain to another.

A VA has fundamental differences from a traditional text alphabet. VAs represent collections or sets of Vision Characters, and are the basis of indexing of composite vision objects. The set of VCs in a domain can be dynamic and changing. Thus, a VA can be dynamic, rather than being composed only of a predefined static set with a fixed number of characters. The number of elements in the VA set in a domain can change, growing as new elements are added, and shrinking as elements are removed.

In the visual domain of retail, each new product grows the VA set and every retired product reduces the set. Similarly, in the visual domain of documents, every new paragraph added grows the VA set and every deleted paragraph deletes the VA set. Vision Characters (VCs) have visual boundaries and can be observed and detected from an image. The VCs have distinctive visual characteristics by which they can be identified. In one example, there will be objects from an image that are visually identifiable by the system that are not included in the VA, and thus will not be recognized as VCs.

VCs can be thought of as higher-level building blocks with distinct visual characteristics that enable their identification. The VCs are macroscopic as compared to pixels. Thus, the vision objects of the VA (i.e. VCs) are larger building blocks of an image as compared to other building blocks or elements such as pixels in an image or text characters in a document. The VCs represent visual objects that occur frequently enough or in high enough density within an image space to enable the interlinking of images. As higher order and bigger building blocks, they enable new and faster ways of searching, matching, and organizing images.

VCs have distinctive characteristics that enable their precise identification or specific identification with high efficiency and with high levels of accuracy. The VCs are characteristic visual building blocks found in images of structured composite objects in that visual domain. For example, in the retail domain, items or products on a shelf are vision objects in an image of a retail shelf. In the screen-sharing or shared workspace domain, filenames, lines of text, and paragraphs can be vision objects in an image of a screen-shared document. Retail shelves and documents are examples of structured composite objects with observable visual structure and distinct appearance.

A VC can typically fit in its entirety into a single image of the composite object, depending on the zoom of the image. In the typical image that would be made for a typical use case, one or more VCs will easily fit within the size of a single image frame. A single image frame can typically include several VCs. Despite having multiple visual objects in a frame, the vision objects are relatively large components of the image; empirically, they are of sufficient scale to be visually identifiable at the resolution of the frame. Being identifiable at the resolution of the frame refers to the objects not being so small relative to the image as to be difficult to identify efficiently.

In one example, individual VCs have rules that govern their correct placement and orientation within a composite object. In such an example, the placement and orientation of the vision object is itself part of the visual identity of the element. For example, products on a retail shelf are placed right side up (unless they are incorrectly placed or oriented). Similarly, a line or sentence in a shared document is horizontally oriented (e.g., not diagonally). Lines and paragraphs flow from left to right and top to bottom. A filename element will be at the top of a document but not within the document.

In one example, VCs have specific patterns of occurrence and organization of a collection or group of elements in the composite object. The VCs can be organized by implicit rules to form a structured composite object. For example, in a typical retail store, there are typically several items on a single shelf, and the items are placed in rows next to each other on a shelf. As another example, in a typical shared workspace document, there are usually several paragraphs, and two paragraphs on a page do not visually intersect with each other. Such rules regarding paragraphs can be true whether the document is a word processing document, a portable document format (PDF), spreadsheets, slide-decks, or other documents.

In one example, VCs are specific to a visual domain and belong to distinct types or classes with distinct implications and meaning in that visual domain. For example, a retail domain can include shelf labels and product items, which are two examples of VCs that denote different very kinds of on-shelf objects. Similarly, in a shared workspace domain, filenames, paragraphs, and page numbers are three examples of VCs with distinct meanings.

Figure 2:
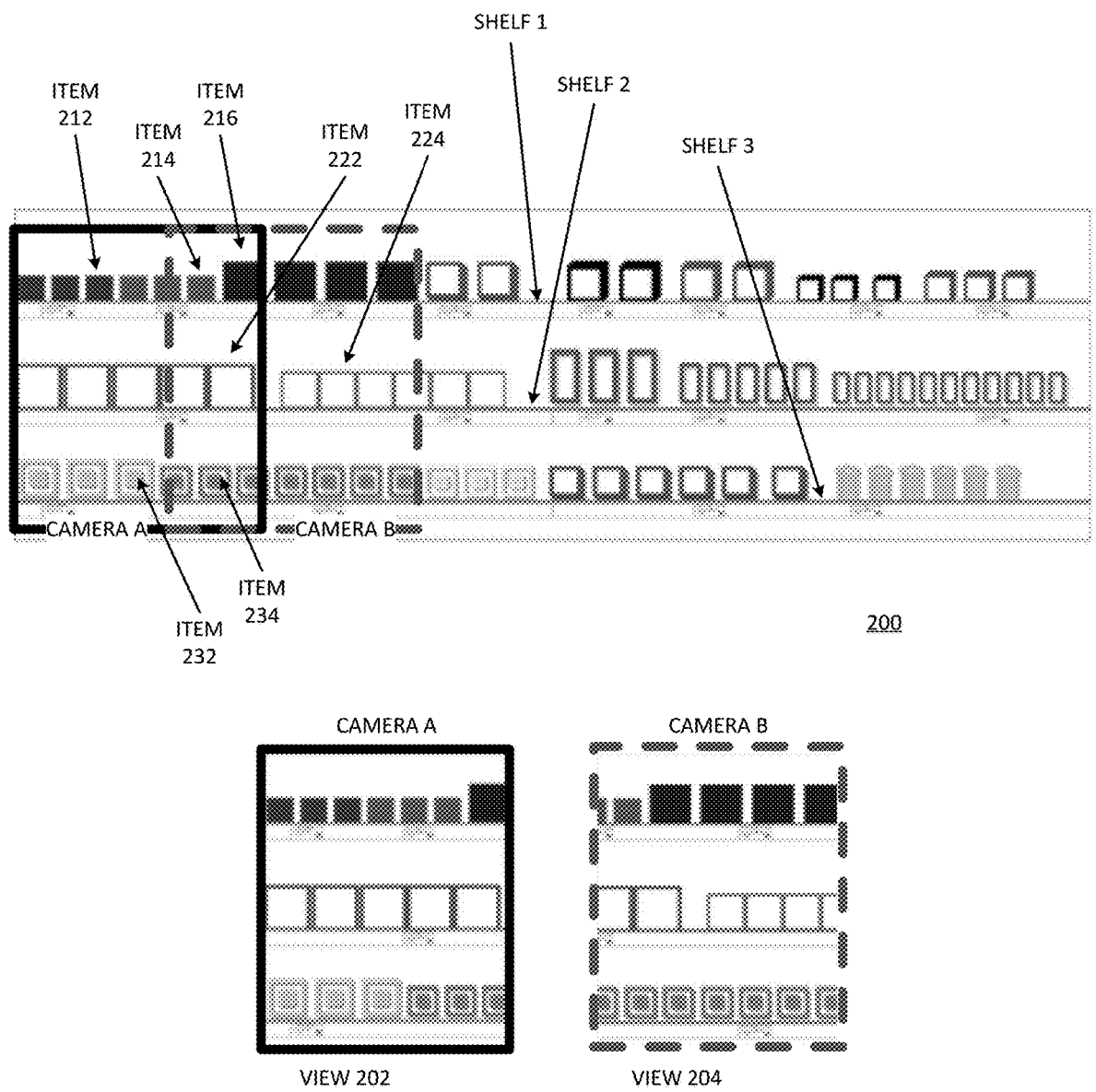
FIG. 2 provides an illustration of products on an aisle for processing by a computer vision system, including a separation of camera views for a computer vision system.

FIG. 2 provides an illustration of products on an aisle for processing by a computer vision system. System 200 represents a retail domain example. System 200 includes multiple shelves, Shelf 1, Shelf 2, and Shelf 3, which are monitored by a computer-vision system.

System 200 illustrates a representation of a view from Camera A, which represents a device that generates an image stream for processing by the computer vision system. System 200 also includes a representation of a view Camera B, which represents a second device that generates an image stream. Some of the views of Camera A and Camera B overlap, allowing the computer vision system to identify the entire environment of system 200 covered by cameras or optical capture devices.

Shelf 1 includes different types of items, including item 212, item 214, and item 216. Shelf 2 includes item 222 and item 224. Shelf 3 includes item 232 and item 234. It will be observed that other items are visible on the shelves. The identified items are item types identifiable by a computer vision system from image streams from Camera A and Camera B.

System 200 illustrates view 202 from Camera A and view 204 from Camera B. The specific items are not labeled for the individual camera views, but will be understood by reference to the entire shelf. It will be observed that item 212 is only visible in Camera A, which item 214 has items viewable in Camera A and in Camera B, although neither camera views all instances of item 214. Item 216 has an instance viewable in Camera A and Camera B, which Camera B captures all instances of item 216 and Camera A does not.

Both Camera A and Camera B can see instances of item 222, while Camera A sees more instances that Camera B. Camera B views instances of item 224, none of which are viewable from Camera A. Camera A can see instances of item 232 and instances of item 234. Camera B sees instances of item 234, but not of item 232. Camera B sees more instances of item 234 than seen by Camera A.

In the retail domain, a store can be considered a large composite visual object having multiple aisles. Aisles can further be broken down into shelves or shelf units containing rows or columns of products. Aisles, shelves, and shelf units can also be composite objects. Finally, products or items make up the shelves. There can also be electronic shelf labels (ESLs), traditional shelf labels, price tags, coupon holders affixed to the shelves, and other elements. The products/items, ESLs, shelf labels, price tags, and coupon holders are all elements that make up a shelf. The elements that make up the shelf can be examples of Vision Characters (VCs, which are described in more detail below) in the context of retail shelf images. The VCs in a vision-based retail environment can enable scenarios to be addressed such as inventory count, inventory availability, pricing, checkout, or other retail operations.

Currently, when people shop online, they do so on store webpages with text-based links. An item that is actually on the store shelf may be very different from what is listed online. Instead, consider a new online shopping experience, where users can virtually shop for items on shelves at a retail store or warehouse. Cameras in front of each shelf can capture image streams of the objects on the shelf. The users can see the image streams in a virtual shopping experience. Shoppers can virtually shop by selecting items seen in the shelf images and adding them to their shopping cart. The users can view the shelves online in realtime or near realtime, select items, and add items to a cart from the images of the shelves. Thus, in this new experience, users can virtually visit, search, and shop at the physical store.

System 200 provides an Illustration of products on an aisle. The system can generate image streams from Camera A and from Camera B. The aisle or long shelf can be a "composite object" made up of several blocks of shelves. Each of the shelf blocks or shelf objects has recognizable visual elements like items/products and shelf labels. View 202 and view 204 represent the separate camera views. It will be understood that the views of the two cameras overlap, capturing some of the same shelf items in the two different camera views.

The capabilities of a vision alphabet-based system can include the following, described in terms of the retail domain example. With the capabilities described, the system can overlay an image with selectable elements, making every image interactive.

In one example, the system enables visual linking and deep linking. For example, a user can click on or otherwise navigate from an image or image stream of a retail shelf view to view similar shelves in other locations (e.g., in the same store or nearby stores). As another example, the user can double click on (or otherwise navigate from) particular items (products) in the image or image stream of the retail shelf to see the product details, pricing, or other related information for the item/product.

As another example of visual linking, a user can drag and drop selected items from the image or image stream of a retail shelf and add it to their shopping cart or saved items.

In one example, if the user adds to their cart the last item on the shelf, the system can send a message to retail store operations or store manager asking when more units of the same product will be in stock, update backend inventory and operation information systems, make an order, or perform other actions related to the product. In one example, the recipient of the message receives a link to an image of the empty shelf where the product was located and information related to the stock-out.

In one example, the system enables logical mapping of the images of a composite object. The system can provide a view of a logical map of the store across multiple shelves with relevant information as an overlay to a user. The overlay of relevant information can include product categories, promotions, or other information.

The system can map the retail environment in realtime or near realtime. A user can use the map to go to the image or image stream of a particular shelf, and then swipe across (or otherwise navigate from) an image of a particular retail shelf view to browse through views of adjacent shelves.

In one example, the system enables visually searching and organizing images. The user can query the system for one or more items, which can then return multiple image streams of shelves containing the requested items.

With image streams of a large shelf from cameras with overlapping but slightly different or offset views, the system can show the user one of the camera views based on certain dimensions of relevance, such as product of interest, how close to center of the image an item is, or some other factor.

In one example, when multiple image streams show the same part of a shelf, the system can filter out duplicate image streams. Thus, the system can filter out identical or nearly identical views of the same items, reducing the cognitive overhead of seeing multiple streams with the same visual information.

In one example, the system can highlight one or more particular items in the image stream of a shelf provided to the user. Highlighting items differently, such as by using different colored bounding boxes, can indicate specific information about the items. The information can be, for example, price discounts, advertising, low-supply alerts, or other information.

In one example, the system provides additional items, such as icons or product image pixels, overlaid or inserted on the image of the shelf presented to a user. The additional information can indicate promotional information, advertising details, sponsored placements, or other information. In addition, the overlays or insertions can be placed for specific criteria such as user, time of day, inventory levels, sales velocity, or other criteria.

The system can provide visual event detection, event ranking, and synthesis of visual events and identified items. In one example, the system notifies a user when a wish list item is stocked. The system can detect that the item is stocked when it starts appearing on the image stream of a shelf, and generate a notification to a user that has requested or wish listed the item. In one example, the system alerts a store employee when the last item on a shelf is picked up. The system can determine that a product is out of stock when it is no longer visible in the image stream of the shelf. In one example, the system can alert a store employee of anomalies in shelving, such as identifying misplaced items. The system can detect misplaced items when a product appears in the image stream of a shelf where the item does not belong. The system can also send the information pertaining to stock-arrival, stock-out or anomalies (as in above examples) to back-end inventory or operational information systems.

The system can allow a retailer to detect certain product movement events, such as providing information to the retailer about which items are being picked up by users and then immediately put back on the shelf, without the product getting added to the cart. In one example, the system can provide a retailer a visual summary of product turnover. In one example, this visual summary could be in the form of a video having key or relevant image frames capturing the before, during, and after of product movement, along with related information. Thus, the system can visually summarize the products that are being removed or picked up from shelves during the day, which can be a summary for specific products or for all products.

In one example, the system enables persistent visual snapshots of the retail environment. A user can bookmark the image or image snippet of a shelf to add particular items to their wish list. A user can bookmark the image to pause their shopping and return later to the same virtual area to complete their shopping. In one example, the system would link the bookmarked snapshot to the current view of the same self, so the user can seamlessly continue the experience from where they left off.

In one example, the system enables visual filtering for a retail environment. The visual filtering can remove images containing in-person shoppers from image streams provided to virtual shoppers. Thus, in the image streams the system provides to users, the users can only see images of shelves that do not show in person shoppers. The system can filter out images containing in-person shoppers. Depending on factors such as the retailer's privacy policy, the system can block the images containing in-person shoppers from being seen by viewers, blur or mask the pixels corresponding to the in-person shoppers, or otherwise prevent the images or portions of the images with in-person shoppers from being seen by external viewers.

Figure 3:
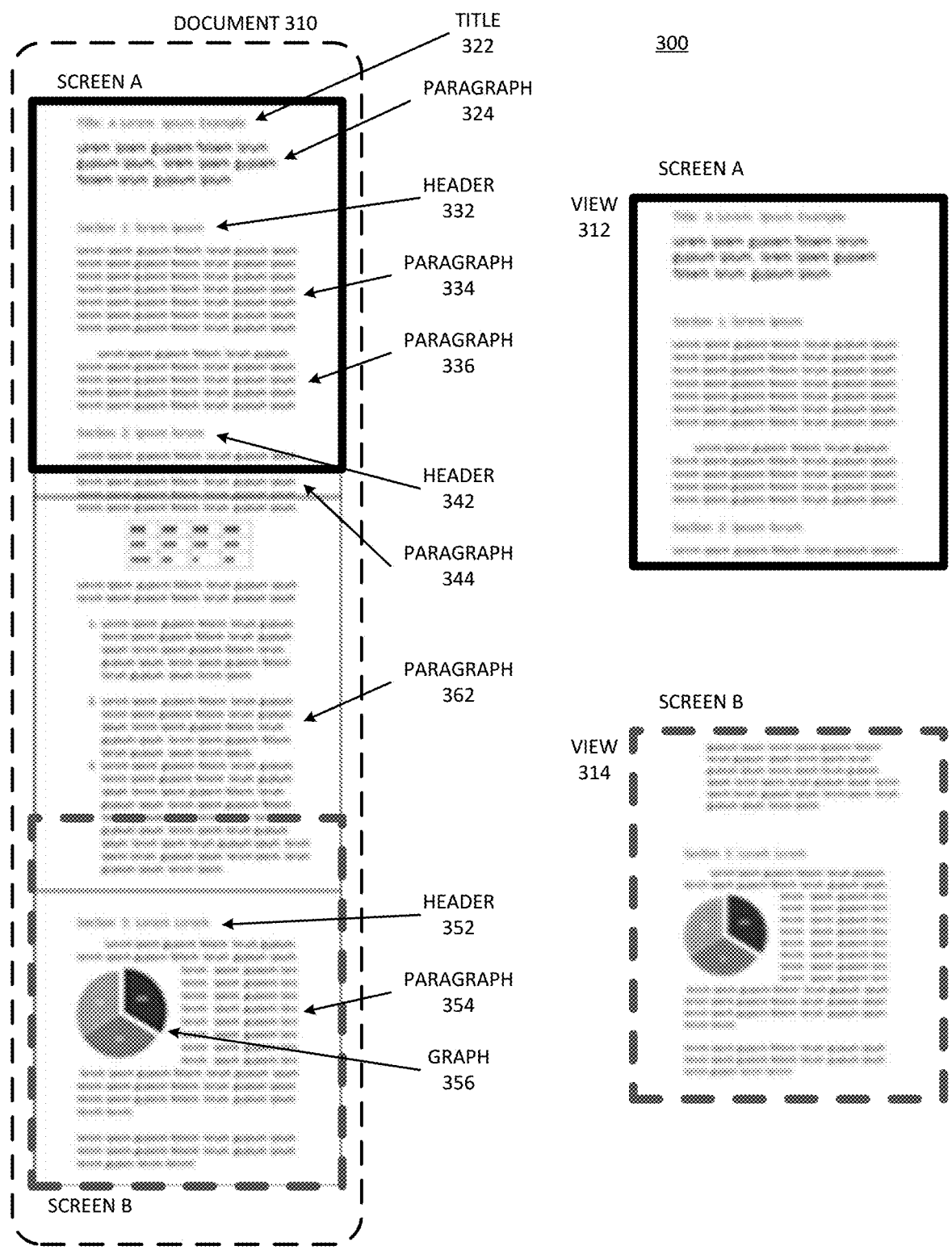
FIG. 3 provides an illustration of sharing a cloud document for processing by a computer vision system, including a separation of screens for a computer vision system.

FIG. 3 provides an illustration of sharing a cloud document for processing by a computer vision system, including a separation of screens for a computer vision system. System 300 represents a shared streaming image domain example or a shared workspace domain example. System 300 includes document 310, which is viewed at different places on different screens.

System 300 illustrates a representation of a view from Screen A, near a top of the document. Screen A, which is represented with view 312, can see title 322, paragraph 324, header 332, paragraph 334, paragraph 336, header 342, and part of paragraph 344. Screen B, which is represented with view 314, can see header 352, paragraph 354, and graph 356.

The contents of Screen A and Screen B as presented in system 300 do not overlap. In one example, view 312 and view 314 will partially overlap. In one example, view 312 and view 314 will completely overlap. System 300 includes paragraph 362, which represents content of document 310 that is not visible in either of the illustrated views of system 300. Other views at other times, or other views by other screens, could potentially view paragraph 362.

In the shared workspace domain or a screen sharing domain, the system can provide similar core capabilities as in the retail domain, to enable new visual user experiences related to screen sharing or document sharing. A shared workspace environment can have multiple image streams, of different user workspaces or user screens shared as different image streams that the system can process to enable an enhanced sharing experience.

In the shared workspace domain, a word processing document in a screen share can be a composite visual object having elements such as titles, headings, lines, paragraphs, figures, tables, headers, footers, footnotes, pages, page numbers, and other elements. Similarly, a spreadsheet is a composite visual object having elements such as cells, row and column headings (letters and numbers respectively), headers, tabs, tab names, and other elements. A slide deck is a composite visual object having elements such as titles, headings, text blocks, figures, tables, headers, footers, slides, slide numbers, and other elements. A browser tab is a composite visual object having elements such as a URL in the address bar, navigational icons, content or a document displayed in the tab window, and other elements. Other document formats will have similar elements. In addition, cloud documents and web pages have elements such as filename, URL or address, active users (icons), cursor, scroll bars, and other elements. All the elements identified above can be elements recognizable by the system as VCs in the shared workspace or screen sharing domain.

Currently, multiscreen sharing of documents by multiple users is not the norm for screen-sharing environments. Rather, one user will share, and the others will see. Currently, when a different user needs to share, the first user stops sharing to allow the second user to start sharing. Furthermore, traditional screen sharing does not allow users to interact with a cloud document or web page in the presenter's screen share in a simple, intuitive way. There may be ability to have the presenter provide viewers with control to the document or the presenter's computer, but this is an intrusive experience in traditional environments, even when the two or more users have permissions to that cloud document or web page.

The system based on Vision Alphabets (VAs, described in more detail below) enables new multiscreen sharing experiences among multiple users sharing selected screens across one or more applications (e.g., cloud documents) from their computing devices. As referred to above, the system can treat each shared (and typically scrollable) screen like a view from a moving camera or sliding window capturing an image of the screen. The system can pool together the shared screens into a group screen sharing experience. Furthermore, the system can enable capabilities on the shared images, allowing user to interact with any of the shared screens. Thus, the system can make every screen or image interactive.

The computer vision devices of system 300 enable sharing of Screen A and Screen B. The different screens (from a single or multiple users) are views of the same document, which is a "composite object" made up of multiple pages. Each page includes recognizable visual characters like titles, paragraphs, page numbers, headers, footer, or other elements. The system can share processed views of the two screens to participant user in the screen-sharing experience, enabling interaction with the document through the shared screens. Such sharing enables the users to work more effectively together on the shared document. View 312 and view 314 represent the separation of the screens. It will be understood that the views of the two screens do not overlap in the diagram, but could overlap and show some of the same material from the shared document.

In one example, the document or computer screen workspace stream includes one or more elements identifiable by the computer vision system. The system can identify a computer vision character from an identifiable element of the computer screen workspace, such as a universal resource locator (URL), an input box, a hyperlink, menu items, actionable drop-downs, buttons, communication icons, messaging icons, a user icon, or other element. The identifiable element can be any element of a shared document, cloud-based document, application in the computer screen workspace, or other component of the workspace visible in the image stream.

The capabilities of a vision alphabet-based system can include the following, described in terms of the shared workspace domain or document screen sharing domain example. With the capabilities described, the system can overlay an image with selectable elements, making every image interactive.

The system can provide visual linking and deep linking. A user can click through from the presented (shared) screen to access, open, and edit a local copy of a shared cloud document or web page. The user's machine could open the document in a new screen which could also be screen shared with the users sharing the workspace.

A user can click through from a particular point on the presented (shared) screen to locate the particular point in their copy of a cloud document or web page. The point can be the location of a block of content, such as a paragraph or a location where another user is working on the document. The user can click on a visible icon for another user in a document on a shared screen and initiate actions based on the selecting of the content. For example, the user can message, invite, email, leave a comment for another user, or some other action, to easily interact or communicate with other users in the group through the shared screen. In one example, a user initiates and sends another user a message containing an auto generated link to a document location or a location within that document, right from a shared screen. Such an action enables users to provide context relevant messages from a shared screen.

The system can provide logical mapping of the images of a composite object. The system can provide a user with a logical map of the entire screen sharing space across multiple documents and users. The system can provide the logical map with an overlay of relevant information, such as users or user actions. The system can provide the map as a realtime or near realtime representation of the shared environment. In one example, the user can use the map to go to a particular screen showing a particular document or participant, and can toggle (or otherwise navigate) between related screens, such as screens grouped by the same document or presented by the same user.

The system can provide visual searching and organizing of images. In one example, the system returns multiple relevant screens showing a document in response to a user query for a document or a screen. When multiple shared screens show different portions of the same large document, in one example, the system provides the user a view of one of the multiple screens based on certain dimensions of relevance. The dimensions of relevance can include whether the screen is the user's own screen, a screen with the most recent version of the document, a screen with the most edits, or some other factor. When multiple shared screens are shown in a shared workspace, in one example, the system provides the user a rank-ordered view of the multiple screens based on certain dimensions of relevance. The dimensions contributing to the relative relevance of a screen can include whether the screen is the user's own screen, a screen with the most recent version of the document, a screen with the most edits, or some other factor.

When multiple shared screens show the same part of the same document, in one example, the system can filter out duplicative screens. Thus, the system can filter out views of identical or nearly identical content to reduce the cognitive overhead of seeing multiple screens with the same visual information. In one example, the system can exclude a portion of a screen image, an entire screen image, or an entire video stream that includes sensitive user information or personal user information. The personal information can be excluded from images captured in a retail environment (e.g., facial features, phone or wallet contents visible on screen) or from images captured in a workspace environment (e.g., personal information on screen, email information, chat windows, or other information).

In one example, the system can highlight parts of a shared workspace viewed by a user to convey specific information to the user. For example, the system can indicate recent edits, messages relating to part of a document, or other information. In one example, the highlights can be specific to a particular user.

In one example, the system can overlay or insert the image of the shared workspace with visual information for a user. For example, the system can overlay pins, icons, or other elements, to convey specific information to the user, such as a pointer or pin for a comment or notes. In addition, the overlays or insertions can be applied when specific criteria are met, such as showing the overlays to a particular user or showing the overlays when a particular type of activity happens. In another example, a user could generate overlays for other user (e.g. leave a pin for follow-up action on a document) and the system can overlay these elements based on certain criteria or relevance factors.

The system can provide visual event detection, ranking, and synthesis. In one example, the system alerts a user when a new document is shared in the workspace. In one example, the system alerts a user when comments have been added or new paragraphs are added to a shared document by a particular user or users. In one example, the system can indicate to a returning user if any contents (e.g. paragraphs) in a screen-shared document have been edited by any user while they were away. In one example, the system can alert a user if specific types of changes (e.g., deletions) are made to content in a document across different shared screens. In one example, the system provides a visual summary of key changes made to a document, like an edited or fast-forward review of major changes across one or more shared screens, or changes by a particular user.

In one example, the system can provide persistent visual snapshots. The system can allow a user to exit a shared workspace and later resume working or screen sharing from a saved snapshot of the image of the workspace from the point where they exited. In one example, the saved snapshot would be linked to the corresponding current image in the stream, so the user can seamlessly arrive at the current point in the experience.

In one example, the system can provide visual filtering. If a user accidentally tries to share a screen that shows sensitive or private information, such as an email inbox, the system can automatically prevent the view from being screen shared. If user forces a screen containing sensitive information to be shared, the system can block part of the image in the screen sharing. Thus, the system can blur or blank out sensitive information in a shared workspace.

Systems such as system 200 and system 300, based on system 100, can provide visual indexing based on vision alphabets (VIVA). In many vision-oriented scenarios involving composite objects, there can be multiple streams of images (image streams), which capture visual information from various perspectives. Processing the images with VAs can provide useful visual information about the composite object, as well as providing the underpinning of visual relationships between images within and across the image streams.

A Vision Alphabet Detector (VAD) detects the characters of a Vision Alphabet within a group of images. The VAD can detect VCs and their respective locations in the images of an image stream. In one example, the system indexes the images based on the VCs detected by the VAD. As such, the system can provide a new type of index, the visual index, which includes the images from image streams of VCs indexed in accordance with a Vision Alphabet. As such, a VA-based approach can be the basis of indexing for the image streams.

In one example, the VAD is specific to a domain. For example, in the retail domain, the VAD can also be a Product Detector, which identifies the product or item by its appropriate unique identifier (such as product name or SKU number in the product catalog). In a screen-sharing domain, the VAD can be a Screen-Element Detector, which identifies the element (such as filename or paragraph) and assigns it a unique identifier. In one example, the VAD optically recognizes characters (e.g., by use of OCR (optical character recognition)) to read and capture text within the visual boundaries of the VC. The text can be visible text on the product packaging (e.g., product name, details such as weight), or, in the example of a screen-sharing domain, text contained in a filename object or a paragraph object. In one example, the VAD identifies the position of the VC in the image as coordinates. The position of the VC can be captured as a bounding box, a mask, an area of interest, or through segmentation of the image.

The operation of the VAD can be as follows. The system receives the captured images or image streams and sends them to the VAD for processing. The VAD detects and extracts in-image pixels (Detected Region) corresponding to the items or VCs in the image stream. The VAD can detect each VC of each image in the stream, where each VC can be defined by and contained within position coordinates or a bounding box or mask of the VC in the images.

In one example, for each Detected Region, the VAD identifies detected VCs with unique identifiers ("VC_ID"). In the retail domain, the most common VC can be the product on the shelf, and the VC_ID can be a product name or SKU (stock keeping unit) number for the product in a retail system. The retail system can refer to a backend system that tracks product, such as a product catalog system, inventory system, point of sale system, or other system. In a screen-sharing or shared workspace domain, the VAD can generate the VC_ID, such as a line_ID for a line object or paragraph_ID for a paragraph object. There are scenarios in a document screen-sharing domain where the VC itself has text characters within the image. In such an implementation, in one example, the VAD employs OCR (optical character recognition) to identify the characters in the text block of the VC and generates the VC_ID.

In one example, the VAD primary control routine can generate the ID. In one example, the VAD includes a module that is part of the VAD that can generate the ID, either as a unique identifier assigned for the VAD, or by lookup to backend system information. When the VAD or a VAD module generates an ID, in one example, the VC_ID can be generated using a function, such as a hash function. The hash can be a hash, for example, of recognizable text characters extracted from the VC, such as providing the text as inputs to a hash function to generate a unique VC_ID.

The VAD can determine the position of the VCs in the image as coordinates or bounding box or mask of the VC. In one example, the VAD derives the position information from bounding box coordinates or mask information of the item. Thus, a VAD can generate output information for a given image including VC identifier (VC_ID) and position information (e.g., location in the image) for each VC identified in the image. The VAD can save the extracted information or the generated output information in a storage location that is accessible by other software programs or other applications. The data can be stored in a file or a database for retrieval. Alternatively, the VAD can pass the output information directly to another software program. For example, a different program can invoke the VAD (e.g., as a function call or invoking of the operation of the module), and the VAD can then return the information directly to the program that called it.

In one example, the VAD detector is a module that includes multiple specialized detectors, able to identify a different type or class of VC. In one example, the VAD is implemented as a dedicated module. In one example, the VAD is implemented as a module integrated into other software. Each Detector would typically be a software program based on a trained neural network or machine learning system. In one example, one or more detectors employ OCR technology in cases where the VC includes text characters.

Figure 4:
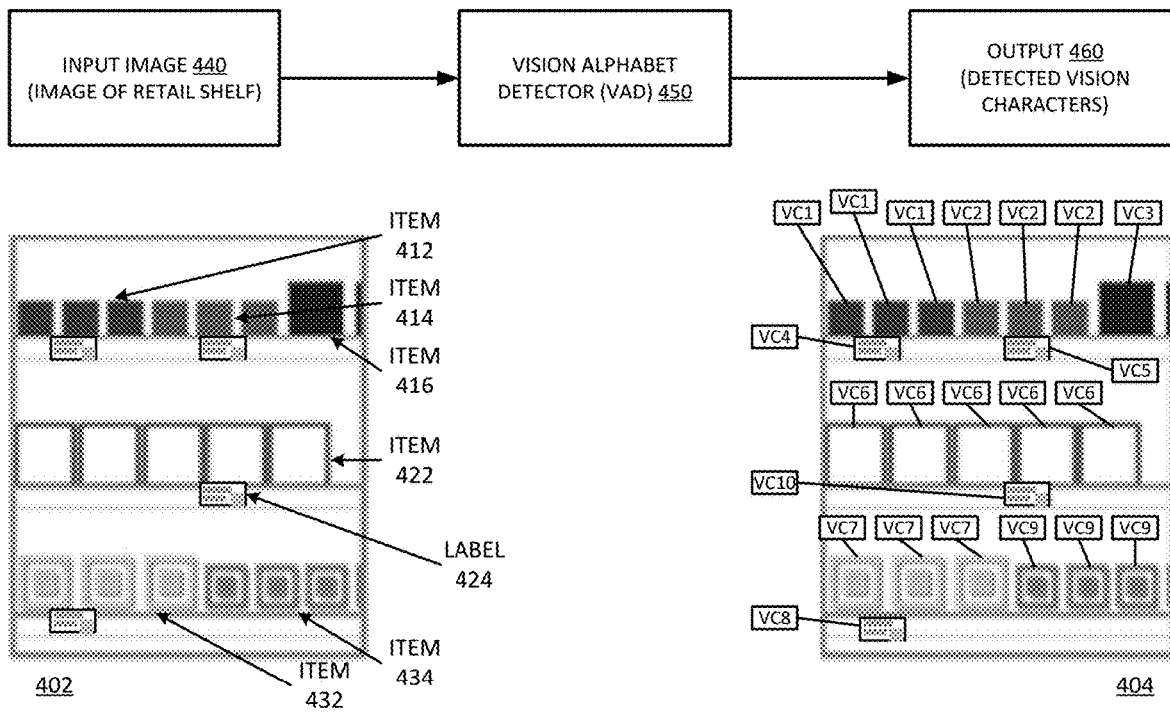
FIG. 4 illustrates vision alphabet detection in a retail domain.

FIG. 4 illustrates vision alphabet detection in a retail domain. Input image 440 represents an image of a retail shelf. View 402 provides details of input image 440. The different blocks represent different products on the retail shelves. View 402 identifies various blocks as instances of item 412, item 414, item 416, item 422, item 432, and item 434. The items are on the various shelves visible in view 402. View 402 also captures multiple labels, of which label 424 is specifically identified.

Vision alphabet detector (VAD) 450 receives input image 440 and generates output 460 based on processing the image with the visual alphabet information. Output 460 includes identified ore detected vision characters. View 404 represents a graphical view of the output information, including vision characters or objects labeled VC1 through VC10, identifying different products on the shelf and different shelf labels. VC1, VC2, and VC3, respectively, represent item 412, item 414, and item 416. VC4 represents a label under VC1. VC5 represents a label under VC2. VC6 represents item 422 of the middle shelf. VC10 represent label 424 under VC6. VC7 and VC9 represent, respectively, item 432 and item 434. VC8 represents a label under VC7.

Figure 5:
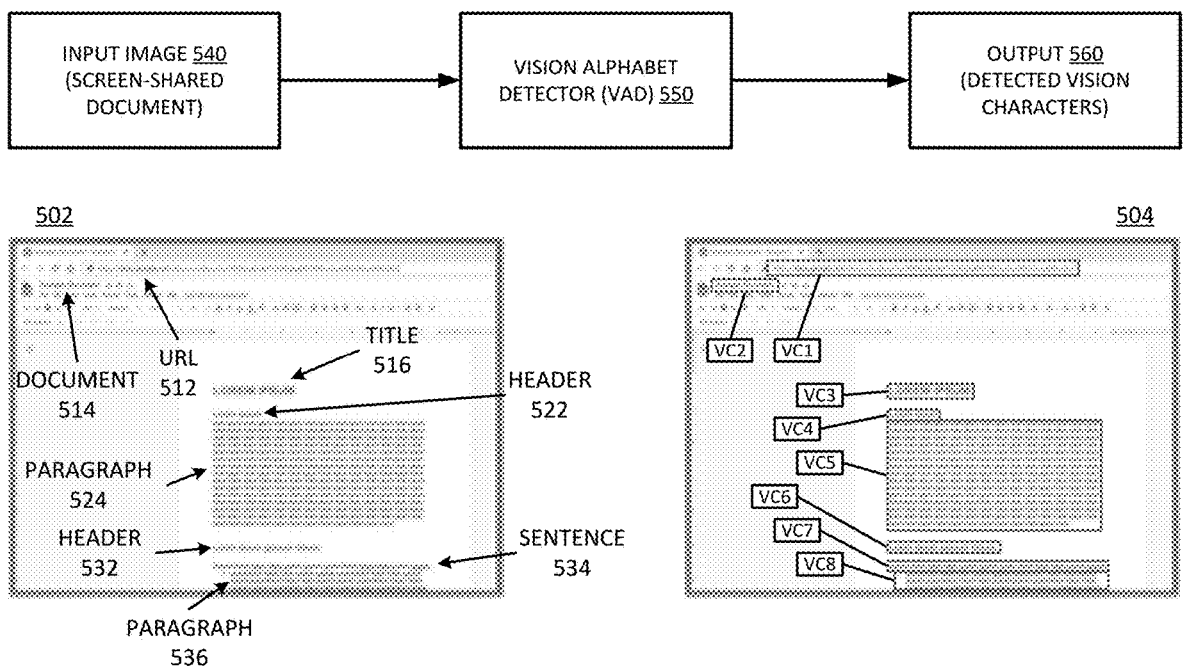
FIG. 5 illustrates vision alphabet detection in a document screen sharing domain.

FIG. 5 illustrates vision alphabet detection in a document screen sharing domain. View 502 provides details of input image 540. View 502 provides details of elements of an image of a screen-shared document. The shared document includes titles, paragraphs, URL, and other elements. View 502 illustrates URL 512, document title/name 514, document title 516, header 522, paragraph 524, header 532, sentence 534, and paragraph 536.

Vision alphabet detector (VAD) 550 receives input image 540 and generates output 560 based on processing the image with the visual alphabet information. Output 560 represents an output image including identified or detected vision characters, labeled as VC1 through VC8, identifying different elements of the shared document. View 504 illustrates URL 512 as VC1, document title/name 514 as VC2, document title 516 as VC3, header 522 as VC4, paragraph 524 as VC5, header 532 as VC6, sentence 534 as VC7, and paragraph 536 as VC8.

Based on output images with detected VCs, such as output 460 of FIG. 4 or output 560 of FIG. 5, the system can perform visual indexing with a vision alphabet (VIVA). For practical reasons, composite objects may not be fully captured in a single image in many visual domains. The images corresponding to a composite object can be referred to as its image-space. The size and scope of certain composite objects can result in fragmentation of views of composite objects across multiple images. Thus, to capture the entire composite object, many sequences of images in a video stream would need to be processed.

In the retail domain, for large composite objects, like a complete retail shelf or aisle (which is typically several feet long), it can be difficult or expensive to try to capture and process the entire shelf or aisle as a single image. Even if a camera sensor with sufficient field of view can be used, there would be issues associated with sufficient resolution of the image and detail in the image to allow a computer vision system to identify VCs.

In a screen-sharing domain, composite objects such as a multi-page documents or slide decks often have a size that cannot be practically fully captured in a single image screen. Attempting to simultaneously view all pages of a long document in a single screen may be impractical, since zooming out sufficiently to capture all pages could result in each page being rendered at such a small size that the content would be unreadable. Furthermore, some documents like worksheets are typically designed for viewing only parts of the entire document (e.g., a single tab in a multi-tab worksheet) on a single screen.

As such, the image streams in many vision domains only capture a part of the entire composite object. Additionally, the different image streams capture different parts of the composite object. Thus, the images within and across the image streams have overlapping fields of view. For example, a screen-share of a document where the user is scrolling through a document will have sequences of images with overlapping views of the same document.

The system can generate a VIVA index to identify the separate components of a composite object. The indexing enables identification of the location of individual VCs, as well as identifying the relationships among VCs. Conceptually, the VIVA index can be thought of like the index at the end of a book, wherein the VIVA index can include an entry for every VC captured from every image. Beyond this high-level conceptual analogy, the VIVA index is different from other indexes in the type of information captured indexed and its dynamic nature. The VIVA index contains, the time, location, and source (camera or screen) for each VC. The VIVA index can contain the information not just for a particular VC, but for specific instances of the VC that are detectable in the image stream. The VIVA index is also updated at in real time or high frequency as the visual information from the sources changed. In addition, the VIVA index, also captures instance level information (as explained further) which contains the relationships between images belonging to a composite object. Thus, the VIVA index captures information about a visually dynamic composite object which is fragmented across multiple images by capturing the relationships between the fragments.

The overall system includes an indexing system to generate the index. The indexing system can include one or more VADs and other modules required to handle image ingestion, processing, and output handling. The indexing system handles multiple image streams which are ingested, managed, and routed to the VAD or a group of VADs. The image streams may also be preprocessed prior to sending them to the VADs. The output from the VAD can be organized and stored in the index. In one example, the index stores and tracks the VC information for each image across multiple image streams, keeping the visual information updated as changes occur in the monitored system. Thus, changes recorded in the images and detected by the VAD can be updated in realtime in the index.

Figure 6:
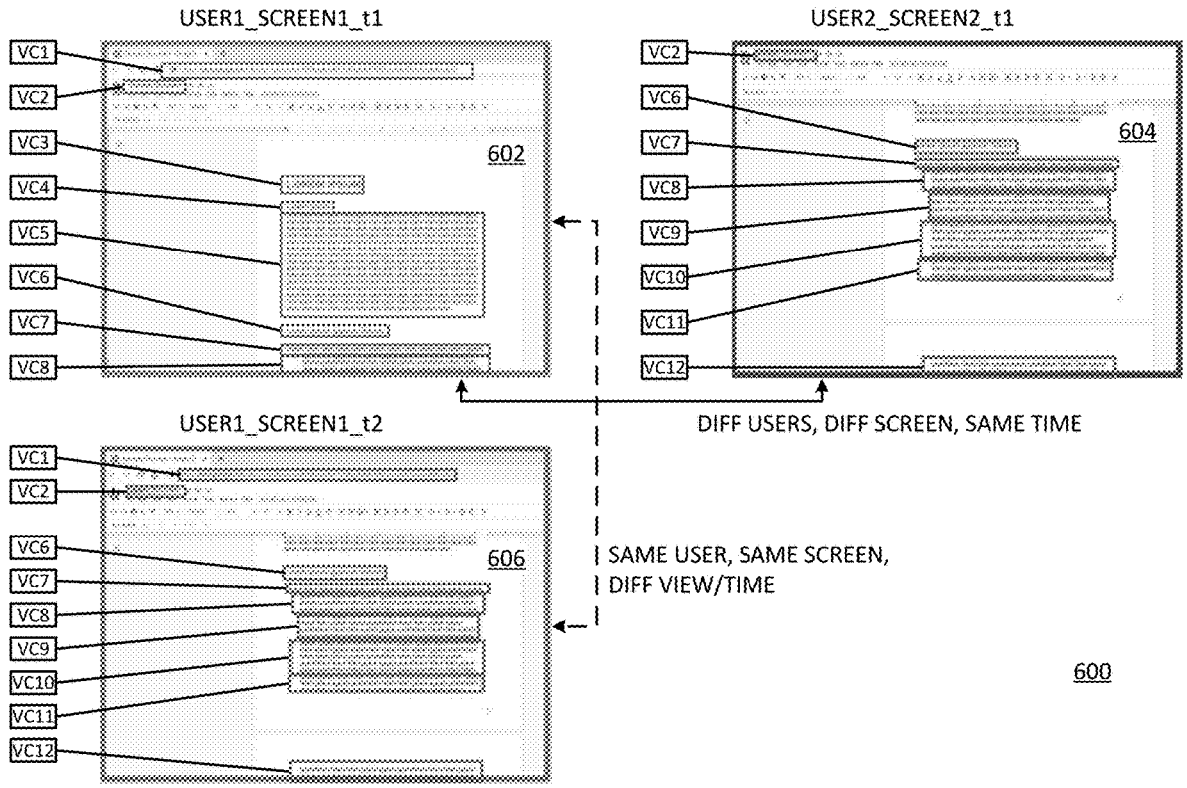
FIG. 6 provides a conceptual illustration of visual indexing.

FIG. 6 provides a conceptual illustration of visual indexing. System 600 represents a visual indexing of a shared workspace domain, and can be in accordance with the example of system 300.

View 602 represents a screen of User 1 at time t1. The identifier for the screen can be, for example, User1_Screen1_t1. View 604 represents a screen of User 2 at time t1. The identifier for the screen can be, for example, User2_Screen2_t1. View 606 represents the screen of User 1 at time t2. The identifier for the screen can be, for example, User1_Screen1_t2. Thus, view 602 and view 604 represent views of different users on different screens, at the same time. View 602 and view 606 represent views of the same user on the same screen, at different times.

View 602 illustrates VC1, VC2, VC3, VC4, VC5, VC6, VC7, and VC8 identified by the computer vision system through a VAD. View 604 illustrates that User 2 sees VC2, VC6, VC7, and VC8. Thus, view 602 and view 604 have partial overlap. View 604 further sees VC9, VC10, VC11, and VC12, which are not visible in view 602. View 606 sees the same content as view 604, at time t2. Thus, the VCs visible in view 606 are the same as those in view 604, additionally with VC1, which is not visible in view 604.

System 600 illustrates table 610 and table 620 with information about the information visible in view 602, view 604, and view 606. Table information such as that of table 610 and table 620 can be generated and maintained by a computer vision system. The tables and diagrams do not necessarily represent an actual design of a usable index. The tables and diagrams are representative of the types of vision characters and identification of vision characters that can be identified.

The system can identify the location of each VC, which can be a relative location or a specific location on a screen. In one example, the location is identified as the coordinates of the centroid of a bounding box for a VC. In one example, the location is identified as the coordinates of a reference corner (e.g., the bottom left corner, referring to an orientation of the image) of a bounding box for a VC. Table 620 includes information illustrating a view of the index with the organization of VCs across different screen images. Thus, the VC is the index parameter, and the Image_IDs identify locations and times where the VC appears.

Table 610 includes information illustrating a view of the index with the organization of VCs on the different screens at different time snapshots. Thus, the index parameter (Image_ID) is the user/screen/time information. Table 610 includes Time information and VC_ID information for each screen. The table identifies a VC_Type for each VC_ID, and a VC location in the image. It will be understood that the VC location can be expressed as coordinates identified in the preceding paragraph.

In one example, as described above, the VAD detects VCs and identifies each VC by a VC_ID and its location in each image in the image stream. In one example, the system identifies each image in the image stream by an Image_ID based on the identifier for the image stream. For example, the camera identifier (camera_ID) in a retail domain can be used to generate the Image_ID. In one example, an image identifier includes a timestamp for the image. As another example, the user name and screen information in a document screen-sharing domain can be used as the basis of generating an Image_ID. In one example, the image identifier in the screen-sharing domain can also include an associated timestamp for the image. In one example, the index captures the image_ID, timestamp, the VC_ID, and the position of VCs in each image. The index can be central or distributed, local or cloud database or filesystem designed to make the data easily and efficiently accessible and retrieved by other software programs or applications.

In one example, the VIVA index is updated in realtime or near realtime to ensure that the index consistently reflects the changes in the image-streams in realtime. In one example, the VIVA index is updated at the lowest possible frequency that allows it to capture as much information as is necessary or optimal to solve a particular scenario. In one example, the update frequency can be varied based on different conditions or criteria. For example, in a retail domain, the frequency of updating can be changed during retail hours, during restocking hours, and during closed hours. As another example, the update frequency can vary based on the number of screens shared in a screen-sharing domain. In one example, the refresh of the index is triggered by specific events (e.g., when an item on a shelf is picked up), as opposed to a defined frequency.

The VIVA index provides a core capability for new scenarios pertaining to navigation, discovery, screen-space mapping, event detection, and screen filtering. With the VIVA index, images can be searched, organized, and matched based on VCs and the relationship information they carry. There are some vision objects that can be captured as VCs but cannot be indexed or represented as text. For example, vision objects such as diagrams in a document or items on retail shelves may not be detectable or represented as text, but can be indexed as Vision Characters.

The VIVA index based on VCs enables indexing of identifiable visual elements of an image stream. VCs are units well-suited for indexing, allowing for faster and more efficient indexing, which can enable visual searching and matching scenarios. VCs are relatively large components of the image, in that empirically they are of sufficient scale to be efficiently, visually identifiable at typical image resolutions in the considered use case. For example, in the retail domain, the item on the shelf is much bigger (in terms of number of pixels) than the lettering on the packaging. And in the screen-sharing domain, a VC such as a paragraph is also several times bigger than a single text character. Just as it is easier to update, search, match, or organize among a small number of larger elements than a larger number of smaller elements, it is easier to visually search, match, and organize images using the relatively large unit size of VCs versus using smaller units.

Thus, in domains like screen-sharing, VCs would enable a smaller and more efficient index for visual searching and matching. For example, indexing images that contain several distinctly identified VCs allows faster and more efficient image indexing as compared to indexing the text by each of the characters or words present in the VC.

Reference to a visual index refers to the index of VCs or vision objects that are identifiable by a vision processing system. In one example, the visual index can include index information that identifies specific instances of a vision object. Thus, detection of identical vision objects in the same image stream can result in index information about the distinct vision objects, rather than just including index information for the type of vision object. Other forms of indexing may track different types of objects, but there is not known any indexing that can index individual instances of objects.

Other forms of indexing may index whether items or objects are found in a search space, but do not provide spatial or temporal information for visual objects. As described herein, the visual indexing can include information about the spatial information for a detected vision object (e.g., VC), to index where the object is found within an image space. Additionally, the indexing can include information about the temporal information for a detected vision object, to index when the vision object appeared in an image stream. In one example, the system indexes both the spatial information and the temporal information for detected vision objects.

Search indexing involving web page crawling (e.g., with a crawler or spider) is based on following links from page to page. The resulting index is thus inherently built on the explicit linking across web pages. The visual index described (e.g., VIVA) can include VC instance-based links as described previously. In contrast to the search indexing that is primarily based on explicit linking, the visual index linking can include links that are based on derived information or implicit linkages. For example, the system can identify relationships between vision objects or instances of vision objects and generate links to represent the relationships that are derived or extracted from the implicit visual information of the image, as well as backend or external data.

Figure 7A:
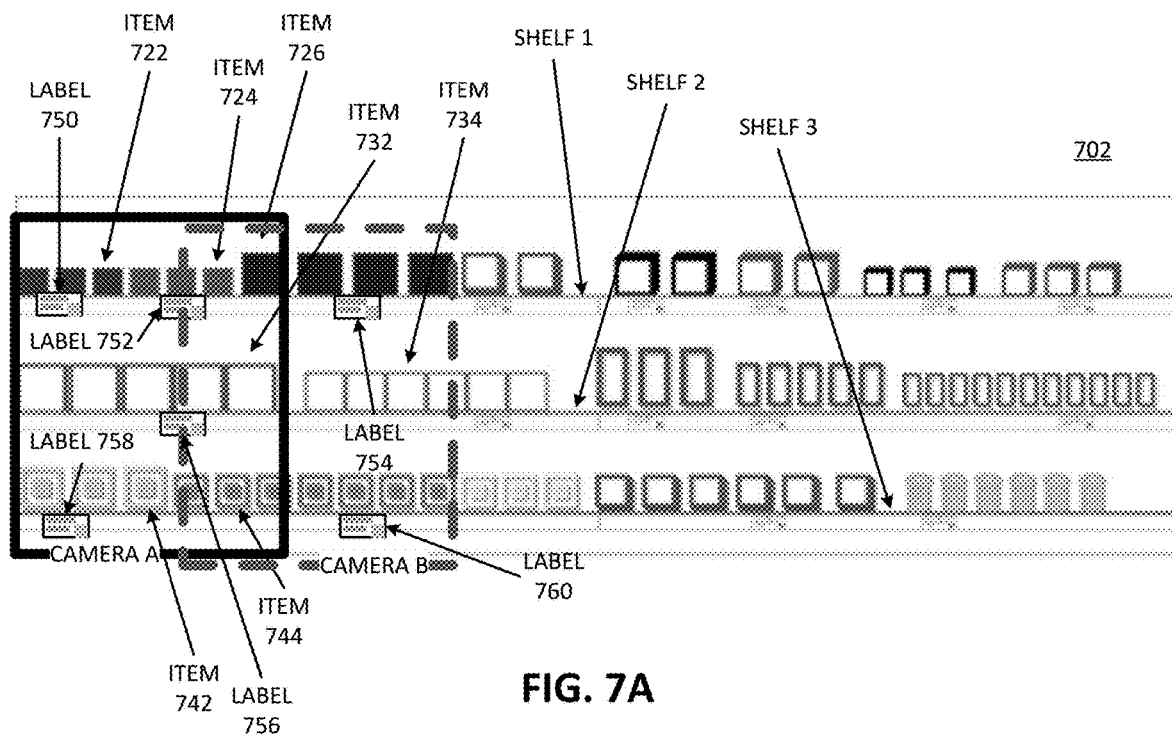
FIG. 7A illustrates an example of image inputs for a computer vision system in a retail shelf environment.

FIG. 7A illustrates an example of image inputs for a computer vision system in a retail shelf environment. System 702 represents a retail domain example. System 702 includes multiple shelves, Shelf 1, Shelf 2, and Shelf 3, which are monitored by a computer-vision system.

System 702 illustrates a representation of a view from Camera A, which represents a device that generates an image stream for processing by the computer vision system. System 702 also includes a representation of a view Camera B, which represents a second device that generates an image stream. Some of the views of Camera A and Camera B overlap, allowing the computer vision system to identify the entire environment of system 702 covered by cameras or optical capture devices.

Shelf 1 includes different types of items, including item 722, item 724, and item 726. Shelf 1 also includes label 750 for item 722, label 752 for item 724, and label 754 for item 726. Shelf 2 includes item 732 and item 734. Shelf 2 includes label 756 for item 732. The label for item 734 is not visible in the views of Camera A and Camera B. Shelf 3 includes item 742 and item 744. Shelf 3 includes label 758 for item 742 and label 760 for item 744. It will be observed that other items and other labels are visible on the shelves. The identified items are item types identifiable by a computer vision system from image streams from Camera A and Camera B.

Figure 7B:
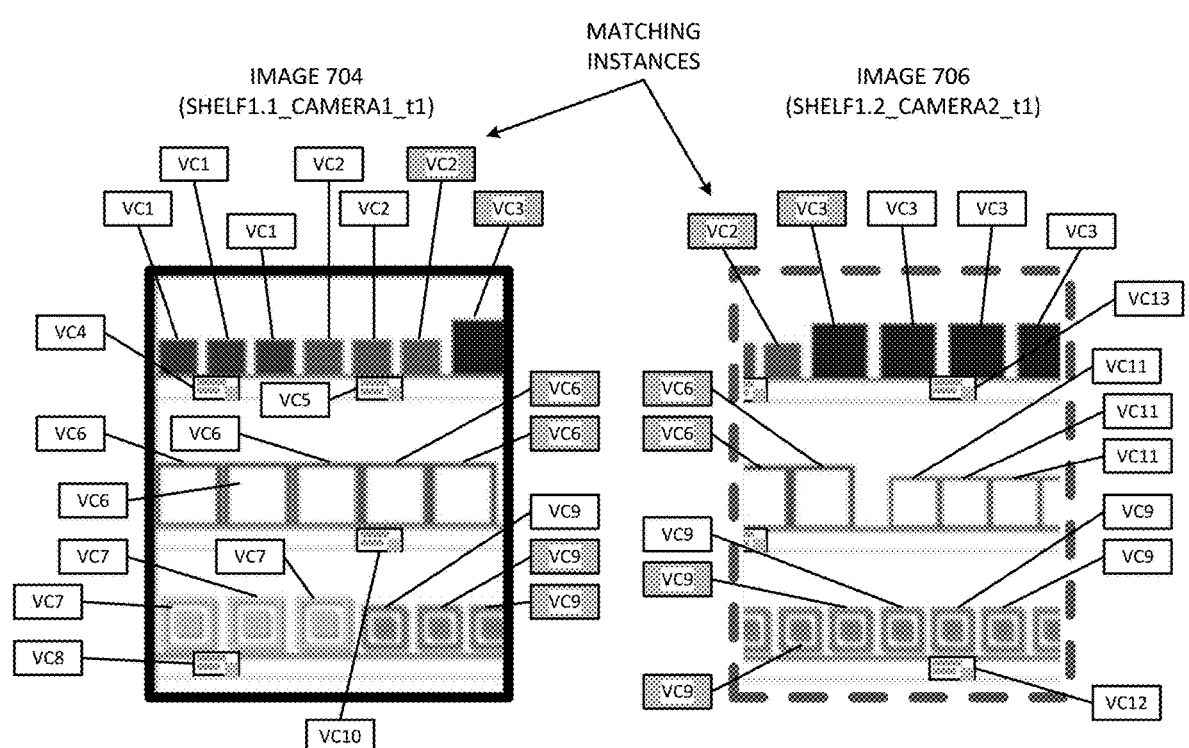
FIG. 7B represents the operation of a VAD to extract VCs from the images.

FIG. 7B represents the operation of a VAD to extract VCs from the images. Image 704 represents the view from Camera A (Shelf1.1_Camera1_t1) and image 706 represents the view from Camera B (Shelf1.2_Camera2_t1). In image 704, item 722 is identified as VC1, item 724 as VC2, item 726 as VC3, label 750 as VC4, label 752 as VC5, item 732 as VC6, label 756 as VC10, item 742 as VC7, item 744 as VC9, and label 758 as VC8. For items having multiple instances, each instance is labeled with the VC type identified by the system.

In image 706, item 724 as VC2, item 726 as VC3, label 754 as VC13, item 732 as VC6, item 734 as VC11, item 744 as VC9, and label 760 as VC12. For items having multiple instances, each instance is labeled with the VC type identified by the system. It will be observed that instances of VCs that are visible in both views (shared by image 704 and image 706), are shaded. VC instances visible in only one view are not shaded.

Figure 7C:
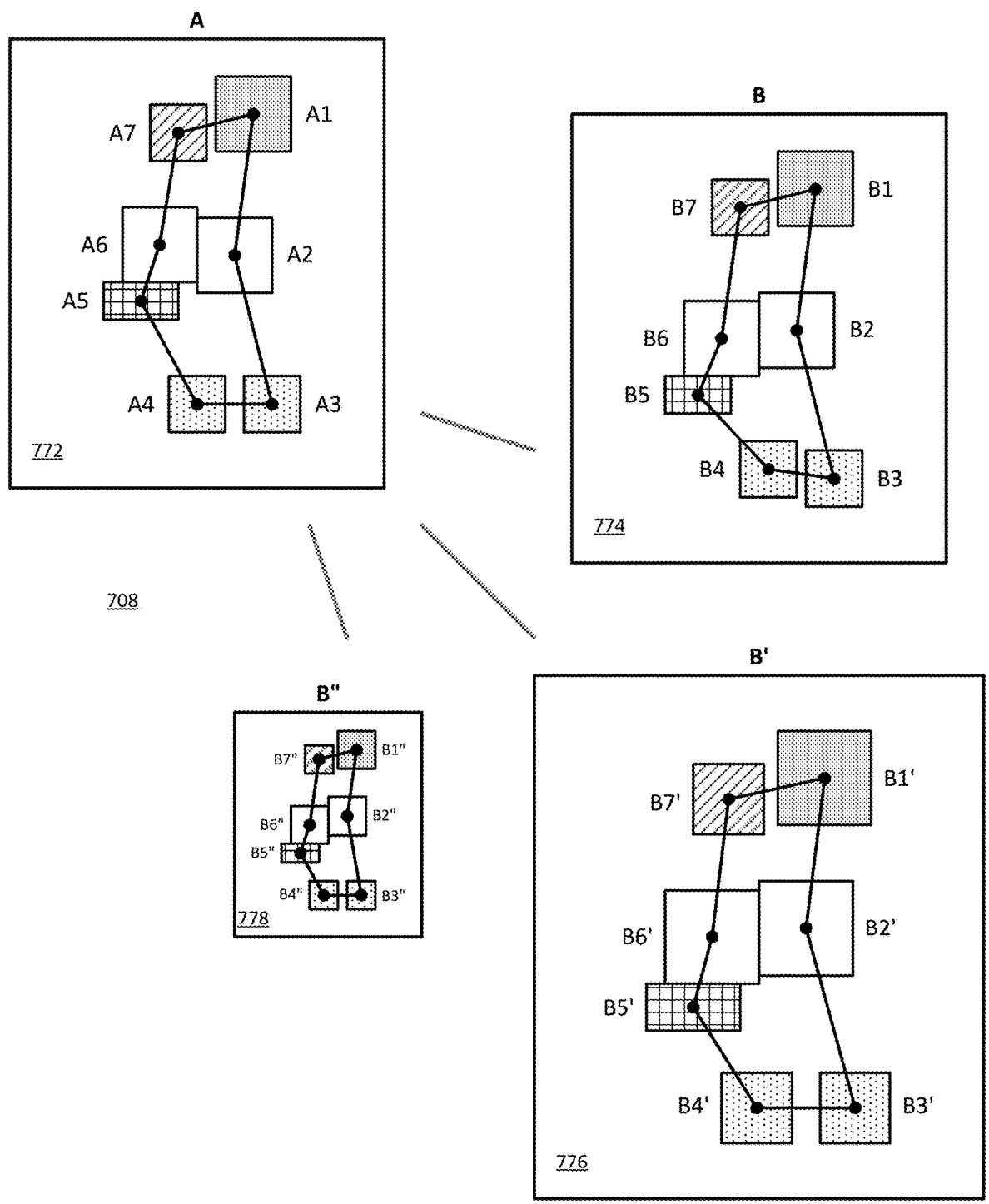
FIG. 7C represents an example of instance matching.

FIG. 7C represents an example of instance matching. For multiple instances of VCs identified, the system can match instances in different images. In one example, the instance matching can be accomplished by scale-invariant vision character instance matching (SIVCIM). Comparison 708 illustrates different scales of images that can be mapped to each other.

In many real-world implementations of a VA system, there will be multiple instances of the same VC, referring to two or more vision objects concurrently in the same image screen or in multiple images from image-streams with overlapping fields of view, which are visually identical. For example, a retail shelf typically contains many units of the same product. As another example, a document may include a duplicate paragraph or duplicate information in different places within the same document.

Scale-invariant VC instance matching (SIVCIM) provides a new way of linking and relating images using distinct instances of VCs. The descriptions above assumed the ability to uniquely identify a VC in an image. As mentioned in the preceding paragraph, in many implementations, there will be multiple distinct instances of the same VC within and across images. Thus, it will be understood that analogous to a traditional text alphabet, the VA can be applied to have multiple instances of the same element or character from the alphabet in the same image.

Consider a composite object having multiple instances of the same VC. SIVCIM enables the system to identify and label the different instances of the VC within the composite object or within the image screen. Consider a composite object that has only one instance of a VC in the composite object, SIVCIM enables the system to identify and match the same instance of the VC across multiple images. As an example consider different views of the same VC (i.e., the same visual object instance) from different image capture sources. In the retail domain, different cameras could each capture the same object instance (corresponding to the same VC) in different streams and the VIVA index would capture the VC information corresponding to that object across the different streams. SIVCIM can identify the instance as the same object in the different video streams, giving the ability to determine the specific and distinct instances of the VC. In the shared workspace domain, multiple users can have the same document open, resulting in the same instance of a VC shown in different shared screens. SIVCIM can enable the system to identify and distinguish the distinct VC instances found in the images of the different user screens.

A VC_ID can uniquely identify a particular VC, but does not in itself uniquely identify each visible instance of the particular VC in a set of images. For example, two identical paragraphs in a single document would have the same VC_ID, or each one of a group of three units of the same product or item on a retail shelf would have the same VC_ID. However, each instance would also have a different location within the image. In one example, SIVCIM utilizes the VC_ID and location of each VC to determine an instance and uniquely identify each one of multiple instances of the VC in a given image.

Instance matching enables visual linking and deep linking of items within images. Once instances across images are uniquely identified, the system can relate the images to each other. Instance matching enables connecting and linking across and within images. The connection linking across images can be referred to as a link, and the connection linking objects within an image can be referred to as a deep links. The connections at a high-level, can be thought of as analogous to how web-links connect webpages. Linking and deep linking of images enables new experiences that span the entire composite object (such as a document or an aisle). Instance matching enables visual linking, deep linking, logical mapping, and visual searching. The VC instances present among a group of images serve as visual links between the images. In one example, the visual linkages across images can be part of the visual index. In another example, the relationships of the visual links can be stored, tracked, or handled separately from the VIVA index itself.

Comparison 708 includes image 772 as reference image A to be mapped to. For example, image 772 can be image information from a VA or library of information. Image 772 includes block A1, connected to block A7 and block A2, both of which are different block types. Block A7 is connected to block A6, which is the same type as block A2. Block A6 is connected to block A5, which is a different type of block. Block A5 is connected to block A4, which is a different block type. Block A2 is connected to block A3, which is the same block type as block A4. Block A3 is connected to block A4. The connections can represent image analysis characteristics, and are not necessarily representative of an image as a human would perceive it. Image 772 represents a computer-vision-based image construct.

Image 774 represents input image B. Image 774 includes blocks B1, B2, B3, B4, B5, B6, and B7 arranged in almost the same pattern, with approximately the same scale as corresponding blocks A1, A2, A3, A4, A5, A6, and A7 of image 772. Thus, the computer system can identify image 774 as an instance of image 772 (i.e., B=A).

Image 776 represents input image B1. Image 776 includes blocks B11, B2', B31, B4', B5', B6', and B7' arranged in almost the same pattern, with approximately the same scale as corresponding blocks A1, A2, A3, A4, A5, A6, and A7 of image 772. Thus, the computer system can identify image 776 as an instance of image 772 (i.e., B'=A). The system can perform the identification even though the scale is different (i.e., larger) in B' as compared to A. However, the other characteristics of the image are close enough to enable the system to perform the identification.

Image 778 represents input image B". Image 776 includes blocks B1", B2", B3", B4", B5", B6", and B7" arranged in almost the same pattern, with approximately the same scale as corresponding blocks A1, A2, A3, A4, A5, A6, and A7 of image 772. Thus, the computer system can identify image 778 as an instance of image 772 (i.e., B"=A). The system can perform the identification even though the scale is different (i.e., smaller) in B" as compared to A. However, the other characteristics of the image are close enough to enable the system to perform the identification.

In one example, the system identifies the common VCs in the two images and matching them based on their positional similarity or relative distances. The matching can be scale invariant. Thus, the match can be determined regardless of the scale of each of the two images. In image 772, image 774, image 776, and image 778 points Ai and Bi correspond to the centroids of the VCs. Alternative location coordinates can be provided, depending on system implementation. For example, instead of center points, the bounding boxes can be identified by left bottom corner coordinates, or some other coordinate.

In one example, the images with common VCs, but which are as-yet undetermined as matching VC instances can be referred to as a comparison set. In one example, the system will start from the edges of each image in the comparison set, scanning for position-based patterns among groups of VCs in one image that match patterns of VCs in other images in the comparison set. In one example, when the detector finds a match, by identification of similar or identical patterns with high correspondence of VCs and their respective positions between the two images, then each set of corresponding VCs (e.g., the set of corresponding VCs at positions A1 and B1) with the same VC_ID (e.g., VC3) is same VC instance (e.g., VC3-1) across images.

FIG. 7D represents an example of instance identification. Image 710 and image 712 represent results of matching in accordance with comparison 708 based on image 704 and image 706 as input comparison sets, compared against a library or VA of images. If VCs with the same VC_IDs (e.g., the same character of a Vision Alphabet) match with corresponding elements of other images, these VCs are identified as the same instance and assign the same Instance_ID (e.g., VC3-1 in both images).

Thus, image 710 illustrates the same VCs as image 704, with specific VC instances identified. Similarly, image 712 illustrates the same VCs as image 706, with specific VC instances identified. The VCs and VC instances can be identified in the images by the notation of VCi-j, where "i" identifies the VC type and "j" identifies the instance of a VC type.

In one example, the system identifies the direct neighbors and the relative distance from each neighbor for each instance of a VC (such as VC3). In one example, the direct neighbors can be direct neighbors in any direction. In one example, the relative distances from each neighbor refers to normalized distances rather than absolute distances, for example, by the distance of the nearest or most distant neighbor. The system can compare the neighbors and relative distances to compare the information against corresponding VCs (e.g., VCs with the same VA_ID, such as VA3) in one or more comparison images. Using relative distances makes this scale invariant.

For two VCs with the same VC_ID in two different images, if there is a match across the two VCs in terms of both the neighbors and relative distances from the neighbors, the two corresponding VCs are determined to be the same instance across the two images. It will be understood that not all direct neighbors of each VC will be visible in the comparison image. Thus, the system can include a threshold to determine how many direct neighbors should overlap to identify an instance as the same instance (e.g., VA3-1 in both image 710 and image 712). For a VC instance that has all the same direct neighbors in the comparison images, the system can readily determine they are the same instance. In the case that not all direct neighbors are visible or identifiable in both images, the system can determine if there is a threshold number of direct neighbors that match, along with a number of other neighbors that also match. Thus, the system can identify the same instance of a VC in different images, as a VC having the same VC_ID and neighbors with the same relative distance from it.

FIG. 7E represents an example of applying Instance_ID generation to indexing. Table 770 provides a representation of the information generated for image 710 and image 712 based on the matching. As illustrated, the system identifies various VC_IDs in the images from two different sources, Shelf1.1_Camera1 and Shelf1.2_Camera2. The system assigns location information, and can then index where individual instances appear within the images. The diagrams illustrate a left-to-right bias and top-to-bottom orientation for assigning VC identifiers, and identification of specific instances of VCs. It will be understood that such an orientation is arbitrary, and the system can assign identifiers in any manner that allows for unique identification of vision objects in the image frames.

In one example, the system distinctly identifies multiple instances of each VC in image streams using SIVCIM. Different instances of the same VC in a single image will have different neighboring objects at identifiable distances. Once the system identifies VC individual instances in a particular image frame in a stream of images, the system can calculate the movement of the identified instances based on the change in the location of the VC from one image frame to the next. Thus, the system can track movement of VCs based on instance identification.

Traditionally, instance-level tracking would be difficult or impractical in a vision-based system. The application of VAs with VC instance identification and tracking enables instance level detection and tracking of objects, including digital or real-world objects. In addition to enabling the identification and tracking of individual instances of a vision object, the application of SIVCIM can obviate the need for detecting instance level and instance specific details to distinguish instances from each other. Approaches relying on micro-details among identical objects (e.g., two cans of the same soup on a retail shelf with slightly different orientations or shape or label imperfections), would require very high-resolution cameras in a retail domain. In contrast, SIVCIM can be applied with relatively low-resolution cameras.

In other purely digital domains, such as document screen-sharing, SIVCIM makes it possible to detect and track identical and duplicative instances without having platform-level access to the digital object. With SIVCIM, instance identification is based on the VCs relationship to its environment versus being based purely on the VC details or vision object detected in and of itself.

In some domains such as retail, movement of users cause occlusion of VCs in image streams which can be detected. When a user appears in front of a shelf, they occlude one or more items on the shelf, by obstructing the view of shelf as seen by the cameras. The occlusion will cause a sudden disappearance of previously detected items. The sudden occlusion indicates motion in the field of view of the camera. In one example, the beginning and end of the occlusion are signals that mark the arrival and departure of a user into a frame, or motion in the scene.

In one example, the system can apply instance tracking for motion detection. In a retail environment with a large number of sequentially arranged and networked cameras on an aisle, motion detection (and user arrival) by a camera can be used to turn on multiple downstream cameras and information displays at the time of user arrival. In one example, the system can turn off the cameras and displays at the time of user departure. Thus, cameras and display units (such as electronic shelf labels) can be turned off when there is no activity detected. Making the retail shelves responsive to camera detection of motion allows for savings in terms of power, bandwidth, compute, and data storage by not having to capture, transport, and process image data when there is no user activity or movement in a scene.

A system in accordance with an example of system 100, an example of system 200, or an example of system 300 can perform dynamic visual mapping (DVM). Dynamic Visual Mapping (DVM) refers to capabilities that enable the logical mapping of an image space. The full set of image streams for a composite object can be referred to as its "image space". A Visual Map refers to a logical representation of the visual space or image space, which enables new user experiences with respect to navigation, discovery, and organization. In one example, DVM of images is based on the application of SIVCIM.

As described previously, for a large composite object, each image stream typically captures only a partial view of the entire composite object. Different image streams can capture different parts of the same composite object, and two or more of the image streams will have overlapping fields of view. All the image streams that include portions of the composite object and collectively provide a view of the composite object, can be referred to as "image space" for the composite object. A Minimal Assembly for Logical Mapping (MALM) module utilizes information in the VIVA index and SIVCIM to enable the assembly of images from the composite object image space into a logical map.

Instance matching enables related, similar, or identical images in an image space to be matched together. Thus, MALM can be a logical mapping of an image space. The system can assembly matched images into a logical map or logical representation of the complete composite object. For example, the system can create a logical map of all shared screens among a group of users, or a logical map of the shelving units belonging to an aisle in a retail space.

Across images, when the MALM module identifies and matches VC instances, the module can identify the optical overlaps between adjacent views. In one example, MALM module matches VC instances based on pattern-matching. In one example, the MALM module matches VC instances based on relative distance of VCs. By identifying the matching VC instances, the MALM module effectively determines the optical overlaps in terms of the overlapping image pixels between images. In one example, the MALM module applies the determined overlaps to stitch multiple images together, for example, for overlaps determined by a SIVCIM module. In one example, the system only performs a logical stitching of the multiple images together, rather than an optical stitching of the images.

Traditional optical image stitching techniques optically stitch pixels across multiple images to attempt to create one seamless larger optical image. Such traditional techniques typically adjust for lighting, viewing angle, sensor differences, and other differences, since the goal of these optical stitching techniques is to create an optically seamless image.

The MALM module creates a logical map that serves as a "visual map" of the image space, where individual VC instances can be identified and mapped within the image space. Thus, a logical map does not require optical matching and optical stitching the different images. Rather, the logical map provides a visually useful logical representation or map of the image space, but can have optical gaps or stitching "defects" or artifacts of the stitching operation that would typically be removed, corrected, or otherwise addressed for optical stitching. The logical stitching of multiple images together into a logical map can be faster and computationally less expensive than optical stitching. In one example, the logical mapping will be generated with visual stitching seams or artifacts, and even with these, it can be adequate for the user experience it needs to support. The logical maps created by the MALM module allow users to observe events in specific areas of the map. Users can also explore, discover, or navigate to particular areas of the map in accordance with specific use case examples described below.

Figure 8:
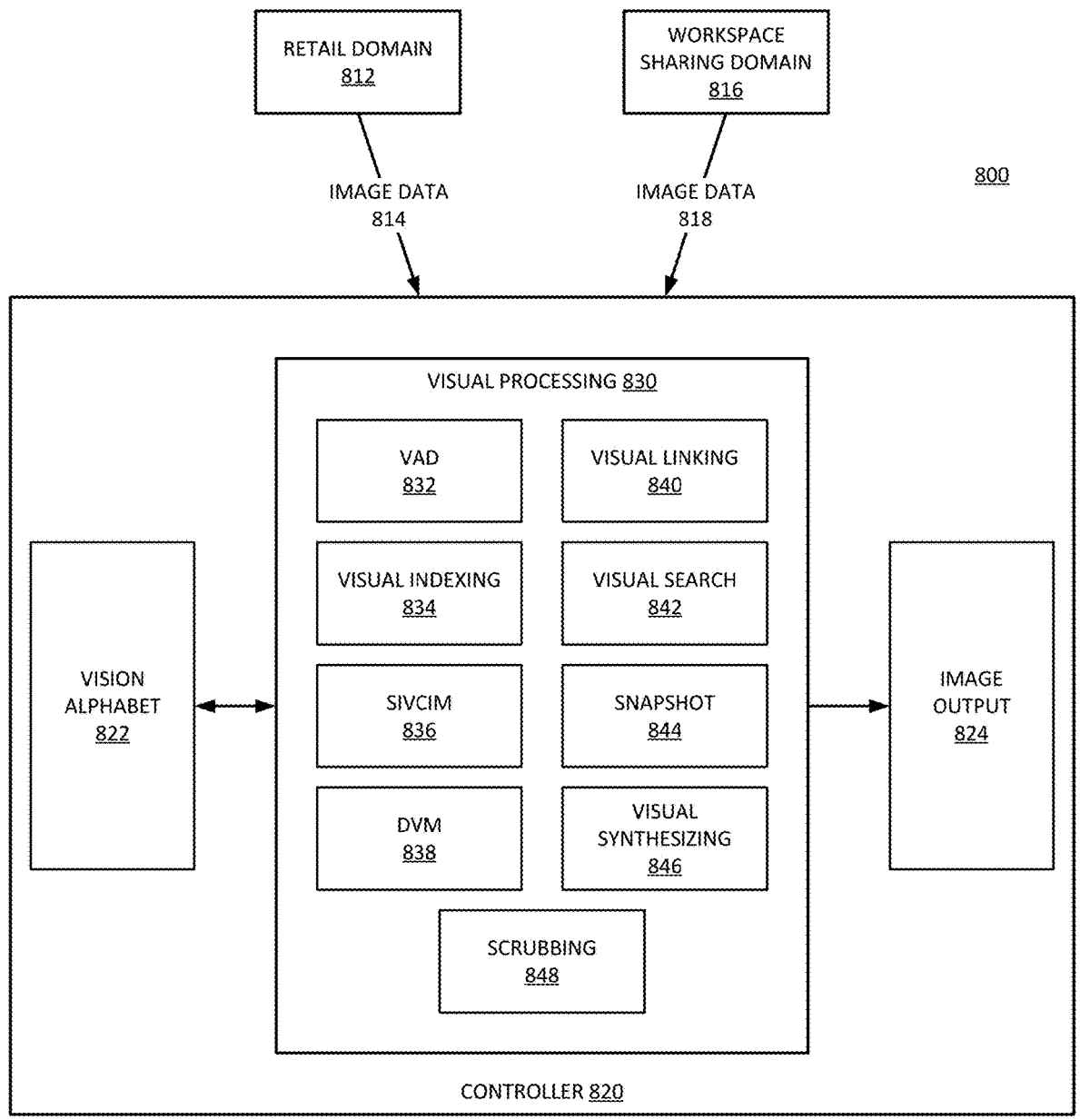
FIG. 8 is a block diagram of an example of a computer vision system that performs visual processing based on a vision alphabet.

FIG. 8 is a block diagram of an example of a computer vision system that performs visual processing based on a vision alphabet. System 800 includes controller 820, which represents a computer vision system in accordance with any example herein. System 800 can represent an example of system 100, an example of system 200, or an example of system 300.

System 800 illustrates retail domain 812 to provide image data 814 to controller 820. Image data 814 represents an image stream of retail domain 812. System 800 illustrates workspace sharing domain 816 to provide image data 818 to controller 820. Image data 818 represents an image stream of workspace sharing domain 816. Retail domain 812 and workspace sharing domain 816 may be alternatives in system 800. For example, system 800 can be a retail domain with a controller specific to retail domain processing. In another example, system 800 can be a workspace sharing domain with a controller specific to a workspace sharing domain. In another example, system 800 can process image information for both retail domain 812 and for workspace sharing domain 816.

Controller 820 includes visual processing 830. Visual processing 830 can include any visual analysis or visual processing capability described. Visual processing 830 can operate based on input from vision alphabet 822. Vision alphabet 822 includes characters of objects. In one example, vision alphabet 822 is separate from controller 820 and accessible by controller 820. In one example, vision alphabet 822 is part of controller 820. In one example, controller 820 can update vision alphabet 822 based on visual processing 830.

Visual processing 830 can include one or more of the following: VAD (vision alphabet detector) 832, visual indexing 834, SIVCIM (scale-invariant vision character instance matching) 836, DVM (dynamic visual mapping) 838, visual linking 840, visual search 842, snapshot 844, visual synthesizing 846, or scrubbing 848. VAD 832 represents a VAD in accordance with any example described, to enable controller 820 to identify VCs in image data received for visual processing. Visual indexing 834 represents any example of visual indexing described, to enable controller 820 to generate and update index information based on visual objects detected in an image stream.

SIVCIM 836 represents vision character matching in accordance with any example of scale invariance described, to enable controller 820 to perform matching of objects to VCs of vision alphabet 822, regardless of scale. DVM 838 represents dynamic visual mapping in accordance with any example described, to enable controller 820 to generate an image map based on overlapping image streams from different sources. Visual linking 840 represents visual linking in accordance with any example described, to enable controller 820 to perform linking of vision characters to hyperlinks, links to content, links to functionality, or other linking Visual search 842 represents visual searching in accordance with any example described, to enable controller 820 to perform searching and organization of image and VC information. Snapshot 844 represents functionality to enable controller 820 to perform snapshotting in accordance with any example described. The snapshots can log information about streams at various points in time and enable tracking of changes to an environment. Visual synthesizing 846 represents visual synthesizing in accordance with any example described, to enable controller 820 to synthesize visual information based on different events occurring within an image stream. Visual synthesizing 846 can enable controller 820 to synthesize information from different sources, detect a change, and perform an operation based on a detected change. Scrubbing 848 represents scrubbing or removal of private information in accordance with any example described, to enable controller 820 to remove personal or private information from a shared context.

Based on visual processing 830, controller 820 can generate image output 824. In one example, image output 824 represents a processed image to send to a user device. In one example, image output 824 represents a processed image to use for processing at controller 820 to identify interaction at a user device with a vision character in a stream. In one example, image output 824 includes an image overlay or includes linking information to provide to the user device to enable a function at the user device. In one example, image output 824 represents processed visual information at controller 820, and based on the processed image content, controller 820 can execute a requested function and return information (visual and/or non-visual) to the user device based on interaction with a vision character in an image stream.

Figure 9A:
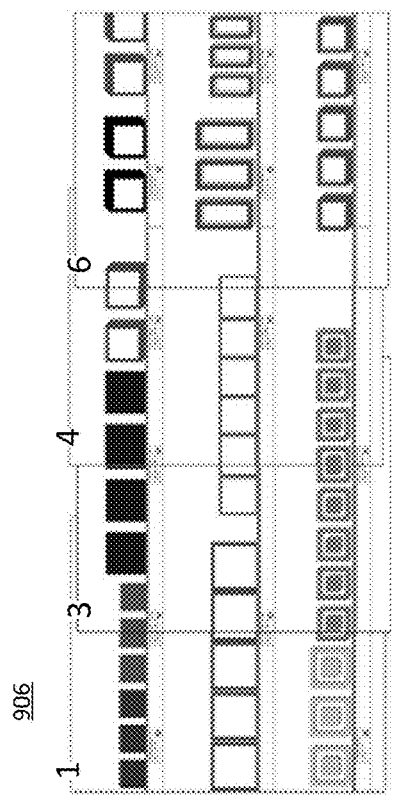
FIG. 9A represents a view of a retail shelf from six camera views.

FIG. 9A represents a view of a retail shelf from six camera views. View 902 represents a retail shelf with multiple cameras capturing different portions of the shelf, with overlaps. More specifically, view 902 illustrates six camera views (1-6) of the retail shelf.

Figure 9B:
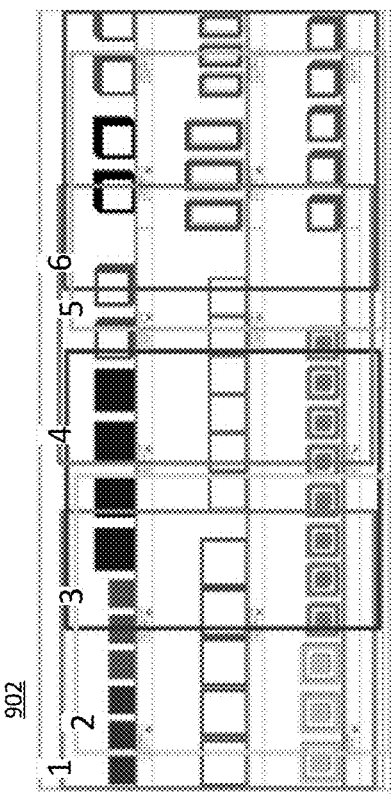
FIG. 9B illustrates overlaps across the images from the different cameras.

FIG. 9B illustrates overlaps across the images from the different cameras. View 904 illustrates overlaps across the images from the different cameras. The separate views from cameras 1-6 are shown fanned out, identifying the overlap and the portions that do not overlap.

Figure 9C:
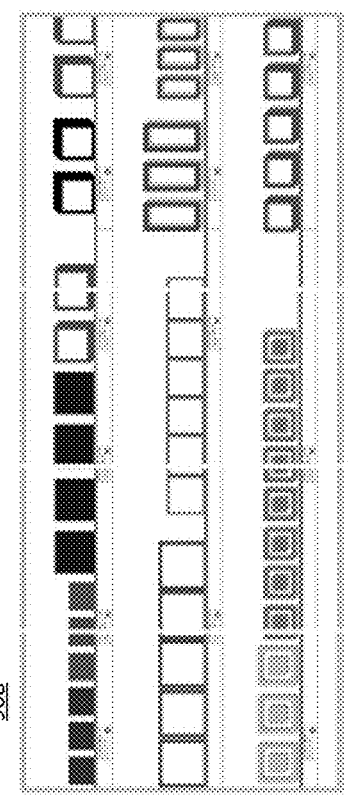
FIG. 9C represents a minimal assembly of a retail shelf based on multiple overlapping images.

FIG. 9C represents a minimal assembly of a retail shelf based on multiple overlapping images. View 906 represents a minimal assembly of the entire retail shelf based on images 1, 3, 4, and 6. Images 2 and 5 contain essentially redundant information. The system can identify the overlap and remove the redundant information for the final map.

Figure 9D:
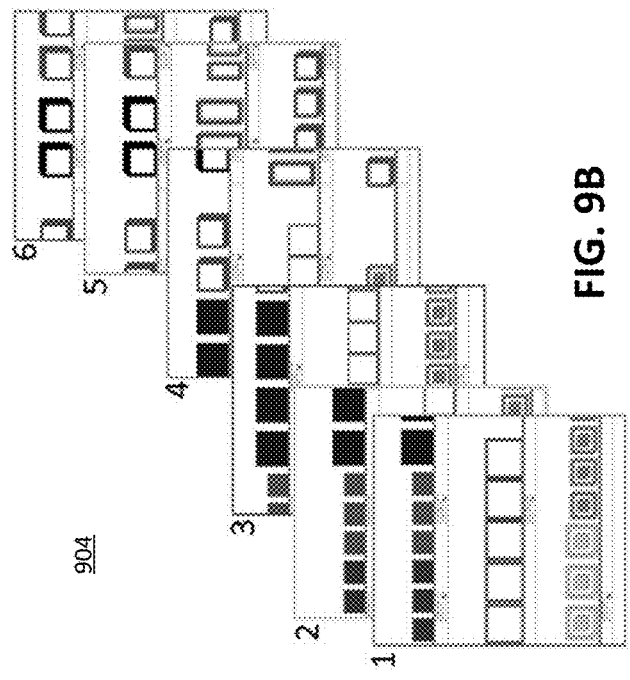
FIG. 9D represents a map assembled from multiple overlapping images.

FIG. 9D represents a map assembled from multiple overlapping images. View 908 represents a map assembled from images 1, 3, 4, and 6. The system can provide a logical map. The map can include seams as illustrated in view 908. While view 908 illustrates a logical map with seams to illustrate such a mapping, in one example, the logical map will have less pronounced seams, or can have no seam or almost no seam. In one example, the logical map can be applied with optical stitching to create a seamless image. However, it will be understood that in many applications, such precision in the stitching of the multiple images is not needed.

As described previously, VC instances can be used to link overlapping frames. In many cases, there may be multiple overlapping image frames linked by a common set of VC instances. In such cases, the first and last overlapping image frames, whether first and last spatially or first and last temporally, containing linking VC instances can be included in assembling the map. In one example, the system discards intermediate frames for assembling the map. Discarding the intermediate frames can reduce the number of frames needed to assemble the map and reduce the amount of redundant overlapping that needs to be filtered out in creating the map. For example, view 906 includes only frames 1, 3, 4, and 6, with frames 2 and 5 not being used to form the map.

In one example, the MALM module can identify VC instances in different maps, and based on the instance detection, link multiple maps together by the VCs. For example, if two users are each screen sharing two cloud documents, the system could create two maps, one for each document. The two maps can be linked by the common VCs (such as corresponding to user icons for the same users), as well as being linked by the user screen information in the index. As such, the system can show the maps together to provide an overall view of the image space for the screen-sharing session of the group of users. Similarly, in the retail domain multiple aisle maps can be shown together in a single layout to show an overall view of a store. In one example, the system can perform scaling consistency. In one example, if the scales of the same VC (in terms of pixel size) are very different across matching images, then the one or more images can be resized to make the images of roughly equal size.

As another example, one or more cloud documents across multiple shared screens can be combined into a whole, interlinked map. Consider an illustration of document screen-sharing with screens showing different portions of the document, with overlaps. These screens could be from image streams across different users or images from the same stream from a single user. When any user scrolls through the screen-shared document, images in the image stream (if the shared screen) capture various parts of the document.

Figure 10B:
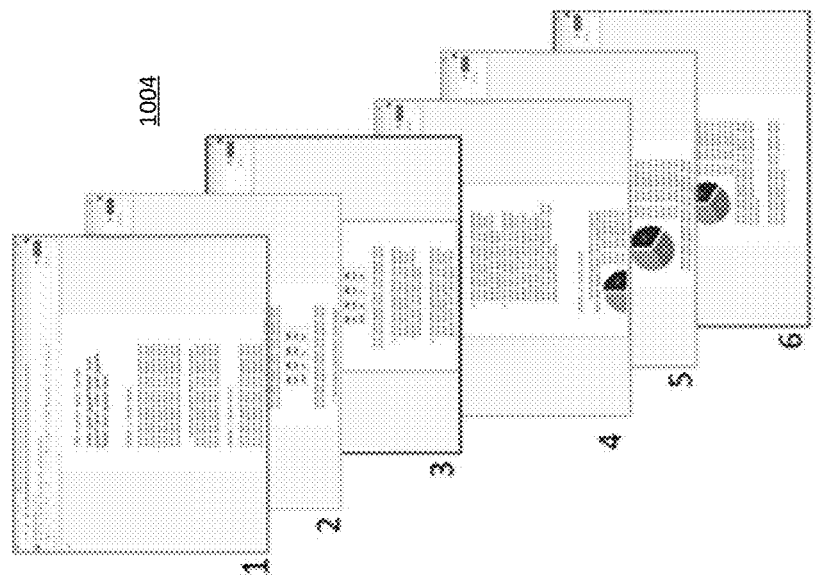
FIG. 10B illustrates an overlap across images from the different screens.
Figure 10A:
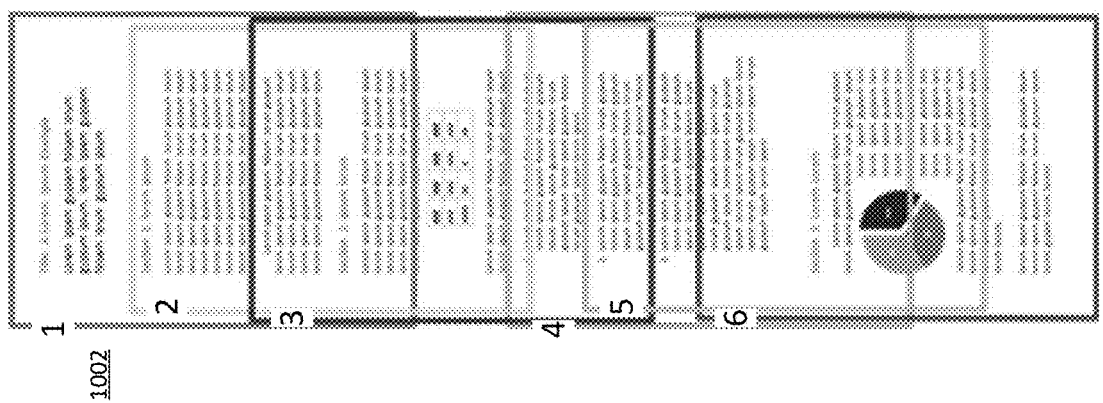
FIG. 10A represents a view of six different images of a screen-shared document.

FIG. 10A represents a view of six different images of a screen-shared document. View 1002 illustrates a screen-shared document as shown with multiple view capturing different portions of the document, with overlaps. More specifically, view 1002 represents a view of six different images of a screen-shared document.

FIG. 10B illustrates an overlap across images from the different screens. View 1004 illustrates an overlap across images from the different screens. View 1004 illustrates the different images fanned out to show how they overlap and where the different camera views do not overlap.

Figure 10D:
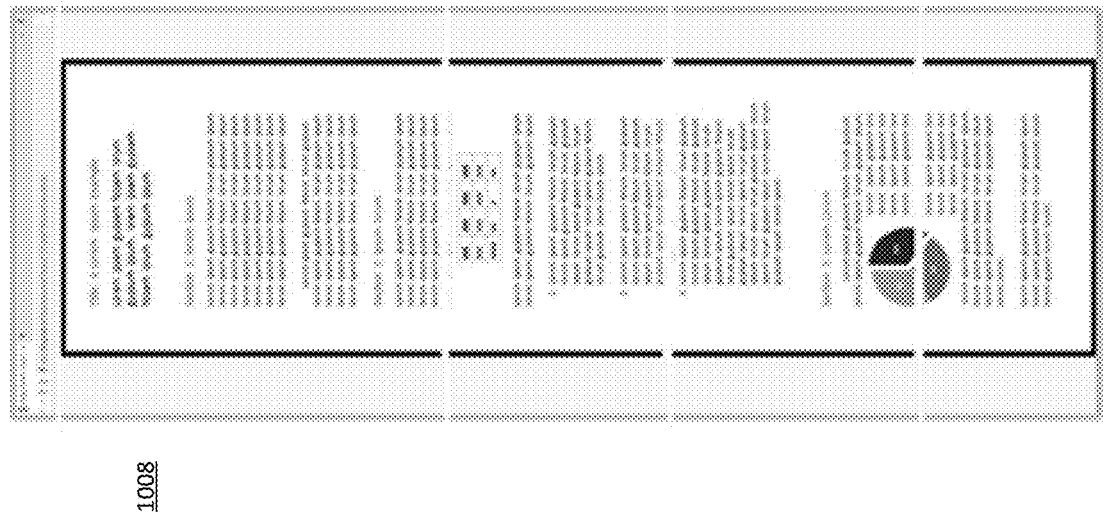
FIG. 10D represents a map assembled from multiple overlapping images.
Figure 10C:
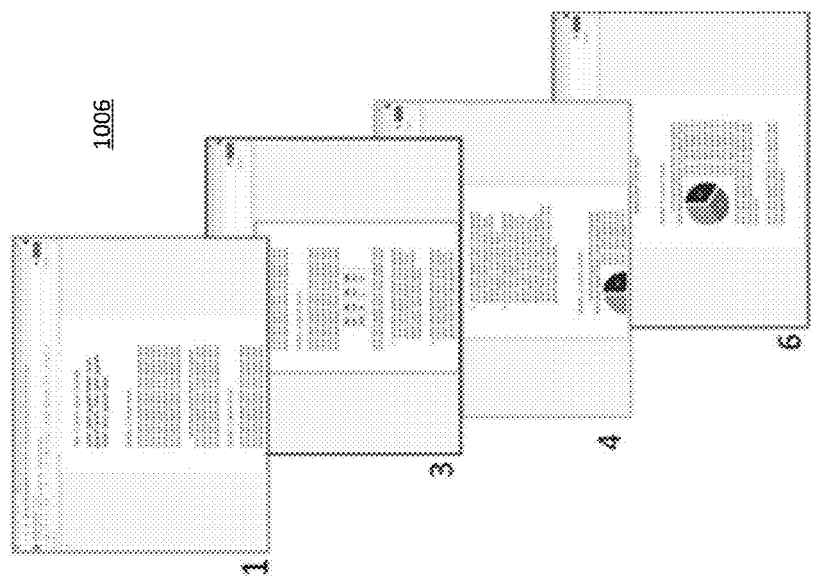
FIG. 10C represents a minimal assembly of a shared document based on multiple overlapping images.

FIG. 10C represents a minimal assembly of a shared document based on multiple overlapping images. View 1006 represents a minimal assembly of the shared document based on images 1, 3, 4, and 6. Images 2 and 5 contain essentially redundant information. The system can identify the overlap and remove the redundant information for the final map.

FIG. 10D represents a map assembled from multiple overlapping images. View 908 represents a map assembled from images 1, 3, 4, and 6. Thus, the system can provide a logical map. The map can include seams in it as illustrated in the diagram. The map can include seams as illustrated in view 1008. While view 1008 illustrates a logical map with seams to illustrate such a mapping, in one example, the logical map will have less pronounced seams, or can have no seam or almost no seam. In one example, the logical map can be applied with optical stitching to create a seamless image. However, it will be understood that in many applications, such precision in the stitching of the multiple images is not needed.

In one example, the system can provide dynamic and automatic refreshing of the logical map. When image streams of a composite object are captured in the VIVA index, the system starts to automatically build out the logical map. As updated views are received in the image streams, the system can refresh the index and update the logical map. Thus, the logical map can be an evolving representation of the image space.

In one example,

In one example, a computer vision system can provide dynamic overlays on a dynamic visual map. The index has information about the locations of various VCs on the logical map. For example, a shared screen domain can include the locations of comments and user icons.

In one example, there is relevant information related to VCs on a map from external sources outside the VIVA index, such as a new price discount on a product on a shelf. The information from within the images as well as the information from external sources are relevant information for users looking at the images. The overlays can be dynamic and change in line with VC changes to the VC information in the VIVA index.

In one example, the MALM module plots and overlays important and relevant VC information as points of interest on the logical map. The overlays show users the activities, movements, or changes related to VCs on the map. For example, as users move through a document or as product prices are changed, the MALM module can update the overlays to reflect the changes.

The overlays can also serve as visual aids to help navigation and exploration of the image space by highlighting important or relevant information. In one example, overlays allow users to drop markers (e.g., pins) for other users with specific messages or information. The system can connect such overlays (e.g., pins or comments) to specific VCs on the logical map. Information from external sources including user generated information that relates to VCs, such as the overlay information can be captured and refreshed in the VIVA index. The information that relates to VCs can be considered VC metadata, which is information related to the VC. In one example, the system can extract related information from processing the image information and identifying the VCs. In one example, the system receives or retrieves related information for VCs identified in the image information.

In one example, a computer vision system can provide visual linking and deep linking. Visual linking refers to the capabilities that identify, extract, or compute the link from a source image or a particular point on a source image to a particular destination image or object or action. Different types of VCs can have different properties, which enable different experiences with linking.

In one example, the linking can include linking to screens, documents, and actions from a dynamic visual map. Map linking allows a user to navigate (e.g., click through) from a point on a Visual Map to a linked object or take specific contextual actions from a particular point on the image. The linked object can be another image or another object. The different points on the map and the VCs (e.g., paragraphs or user icons) can be linked to their locations on shared screens, or within documents, or to actions. Thus, a user can use the map to locate points of interest, which can include user locations within the documents. The points of interest can be across various screens and within the various documents in the various screens. The user can navigate from the point on the map to the actual location within a local copy of a cloud document, or navigate to a shared screen showing the particular location.

In one example, in the document screen sharing domain, a user can see on the map where other users are in a particular cloud document and navigate to where a particular user is viewing the document. The user can, from the map, navigate to another user's shared screen. For example, User A could use the map to navigate to the part of the document where User B is or go to the screen where User B is presenting the specific part of the document. In one example, navigation to the document where User B is viewing refers to navigation on User A's own screen containing a copy of a cloud document.

In one example, in the document screen sharing domain, the user can see where other users are viewing a shared document and message them while they are in that part of the document. For example, User A can initiate a message for User B from the map, where the message is timely and contextually relevant to User B given User B's location in the document at the point in time the message is sent. In one example, in the document screen sharing domain, a user can see the location of a portion of a document within an overall map of the document, and use the map information to navigate to the screens containing the visible portion of the document.

Visual linking can refer to the linking of images to a particular destination (e.g., other objects, images, or actions). The linking can enable a user to navigate from the image to the destination, for example, by selecting or clicking on it. In one example, visual deep linking refers to the linking of specific VCs in an image to a particular location within another image or object. The specific VCs in the image can represent specific locations as the source of the deep link. The deep linking links to a specific destination point within the larger image or object. The destination location could be a specific location in an object such as a cloud document. The deep link can be, following the example of the cloud document, a particular tab in a worksheet, for example. Deep linking allows a user to navigate from the source to the destination, for example, by selecting it or clicking on it.

In the document screen-sharing domain, the screen-share of a cloud document typically shows the document open in a browser tab with the URL of the cloud document or sub-document (e.g., a worksheet tab) visible in the address bar in the shared screen. In one example, the browser tab's address bar represents a particular type of VC, the URL, with specific properties. The URL maps to the location of the document being displayed in the tab. In one example, a VAD identifies the VCs and as part of the VC identification process extracts the URL information. The VAD can then capture and store the URL information in the VIVA index along with other VCs and related information for the image.

In one example, the URL information or other VC related information for the document or sub-document seen in an image of the shared screen is directly sent along with the image in the image stream of the shared screen. In one example, the URL information or other VC related external information is extracted and sent by a software program on the side of the user generating the screen share. In such cases, the URL information can be captured and stored in the VIVA index along with the VCs and related information for the image. In one example, the system receives or retrieves related information for VCs identified in the image information. Information from external sources that relate to VCs, such as the URL information sent along with the image stream can be captured and refreshed in the VIVA index.

In one example, the system extracts VC_IDs for VCs identified in an image. In the case of a shared screen, the VCs identified can include a URL or a link. In one example, the user device can include software that provides URL information or the destinations of web links with the image stream. Thus, the system can identify the VCs and include the information related to the VCs that is provided by the software running on the screen sharing device. In such an implementation, the vision processing system does not need to extract all information for all VCs, but can instead receive some information with the image stream. The information received from the software instead of being extracted by the vision processing system can be referred to as external information. In one example, the system can include external information in a visual index related to VCs extracted by the vision processing system. Thus, the system can correlate external information to VCs in index information.

Thus, in one example, the VIVA index includes URL information for a document in the images in a screen sharing domain. Even if any one of the shared screens of a document displays the URL or has the corresponding URL information sent along with the image stream, in one example, the entire assembled visual map can be associated with the document URL in the VIVA index. Based on the mapping, the URL would also be the URL for other corresponding images belonging to the visual map, which can be true even if the particular image does not display a URL. Thus, users can navigate (e.g., by clicking though) from the document shared screen to the cloud document. The navigation will occur through the image of the document in an image stream of the shared screen. The navigation can enable a user to open their copy of the same document (assuming typical collaboration scenarios where they have access to it when clicking through or navigating to it) in a browser window on their own computing device. In some cases, a user can navigate from the location shown in the shared screen to the same location in their copy of a cloud document (e.g., through "deep-linking").

In the screen-sharing domain, in some cases specific type of VCs such as user icons, comments, or other VCs, may be visible in the shared screen. In such a case, visual linking enables a user to take contextually relevant actions from a point on the shared screen. The contextually relevant action can be specific to what is presented by another user when the point or VC corresponds to that user. For example, User A could click on a visible icon for another User B whose icon is visible in a shared screen and initiates actions to interact or communicate with them (e.g., to message, invite, email, leave a comment, or other actions). In the retail domain, a user can drag and drop selected products (each of which is a VC) from the image (or image stream) of a retail shelf and add it to their shopping cart or saved items.

In the screen sharing domain, from a shared screen showing a particular document, a user can initiate and send another user a message containing an auto-generated link to that document location. In one example, showing the particular document can include sharing a link to a particular location in the document through the shared screen. As mentioned above, the auto-generated link can be a link to contextually relevant messaging or action. In another example, a user could take a visual snapshot of a particular paragraph and save it or share it. The actions can be contextual to the selected or chosen point of interest.

In the retail domain, when a user adds to a cart the last item on a shelf, the system sends a message to retail store operations or store manager asking when more units of the same product will be in stock. In one example, the recipient of the message receives a link to an image showing the shelf where the object was but is now empty.

In one example, a computer vision system can provide visual search and organization. The VIVA index can also provide faster searching of image information than what is traditionally possible. The VIVA index can provide for realtime or nearly realtime visual searching. Based on the VCs used in the VIVA index, images can be visually searched, organized, matched, and presented to users based on the VCs. The results of searching and organizing can be presented to a user according to relevance and ranking criteria. In highly dynamic and near realtime visual domains like screen sharing or retail, there is a very large and rapidly changing image set. In these domains, there is a very large number of images that need to be indexed, and a high rate at which new images are received or coming into the system, which should also be processed into the index. Additionally, there can be a high rate and volume of updates to the index to support a realtime or near realtime visual user experience.

To enable realtime operation in visual domains with high volumes and rates of changes, the VIVA index can be a smaller, more efficient, and faster-to-update index relative to other indexing approaches typically used in domains where data is more static. The efficiency of the smaller VIVA index can in turn enable high speed and realtime freshness of searching, matching, and organizing images. Consider a scenario in the screen sharing domain, where the system creates a much smaller index relative to an approach based on indexing the underlying text characters or even on the words in the document. The VIVA image indexing described can provide a system with a number of VCs that can be one or more orders of magnitude fewer than the number of underlying text characters. With orders of magnitude fewer items to index, the index will be faster to create and update and faster to search and utilize. Thus, not only is the VIVA a faster and more efficient way of indexing images that contains several text blocks, VIVA also enables a highly responsive, realtime or near realtime user experience.

In one example, when a user queries for a particular object where the query corresponds to a VC (e.g., a document filename or retail item name) in a set of images, the system returns the images best matching the query. In the set of image results, each returned image may show a different part of a composite object (such as a document or a shelf). In one example, the system ranks the results set of images shown to the user by certain dimensions of relevance. The relevance and ranking of the images can be user specific. Thus, different users can see different ranking of the images.

In one example, the dimensions of relevance can be domain dependent. For example, in the screen sharing domain, when multiple users are presenting shared screens that display different portions of a large document, the system can show the user a primary screen ranked as most relevant based on certain dimensions of relevance or relevance criteria. In such a scenario, the relevance criteria can include a user's own screen, the screen with the most recent version of the document, the screen with the most edits, or other criteria. In one example, the system provides the user with the option to select the search result desired. Thus, a user can have the option navigate to lower ranked screens, such as screens of other user or screens with less recent edits.

As another example, in the retail domain, when a user searches for a particular item in a set of image streams of a large shelf, the system can show the user a primary image stream in the set of image streams based on certain dimensions of relevance or relevance criteria. The set of image streams can include images from multiple cameras with overlapping but slightly different or offset views. In such a scenario, the relevance criteria can include location of the product of interest within the image (e.g., most centered), or scale of the product within the image, or other criteria.

The system described can perform visual organization. Visual organization refers to the ability of the system to organize, group, rank, sort, filter, and perform de-duplication of related images. The system can enable users to explore or consume a stream of images across one or more composite objects. In a case where a user explores images, there may be many images that will repeat some or all image information. In one example, the system provides a feature to allow an implicit search in the background. An implicit search refers to a search that is not explicitly initiated by the user, which occurs in the background and results in showing the user a primary view with the highest ranked primary image for an area or region of interest. Providing the highest ranked image enables the user experience of "exploring" the domain through the images without having to consume all or many images with similar or repetitive visual information. The system can provide an option to navigate to or access lower ranked images for the area of interest. The exploratory experience refers to a user virtually browsing through the retail shelves via images of the shelves, or browsing through content in a multiscreen sharing meeting.

The related images corresponding to the implicit search can be grouped together, to enable the user to access them. Examples of grouping related images together by implicit search can include showing images containing common VC instances, images with views of the same composite objects, identical or similar images, images from the same source, or other groupings of VCs. In some cases, the user may can navigate away from the primary view, for example, by sorting or filtering images in a group of images shown. In one example, the non-primary images are ranked as well as the primary images being ranked, which can enable the system to sort or filter the images in response to a user or a software program. The sorting or filtering can be based on the relevance criteria for the images.

The capabilities of grouping and filtering of images can minimize overhead and make it easier for users to view or consume information across multiple image streams. For example, User A can edit page 1 of a document, while user B is editing page 20 of the same document. Grouping of screens by the same document can allow User A to quickly find and navigate to see User B's screen. The grouping and filtering can be based on ranking, which can be user dependent, to result in different rankings being applied to different users.

It is possible that two images containing two different parts of the same composite object may be dissimilar to each other, but similar to different portions of the visual map of the same composite object. Thus, in one example, the system does not compare dissimilar screens directly against each other to infer whether they belong to the same or different composite object (such as the same document). In one example, identical images can be inferred to contain the same set of VC instances, while similar images will have a high degree of correspondence in VC instances.

By grouping identical images (duplicates) and similar images (near-duplicates), the system can reduce or minimize the overhead for users in terms of number of images that users need to consume. For example, if three near-identical screen shares are automatically grouped together, the user only needs to view one of the screens to effectively consume information across all three screens. Similarly, grouping overlapping views of a retail shelf can avoid having the user browse through images that have essentially the same information.

In one example, the system can show a user an assembled set of images. The system can show the images either implicitly or in response to a query. The assembled images can be similar to a visual map as described above. In one example, in the assembled images, the images constituting the visual map are each the highest ranked images among a set of images with similar views of the composite object. The ranking of the images can be user-specific, to result in relevance and ranking of the images to potentially be different for different users In one example, the user can see images in the results with overlays. For example, the overlays can include pins, highlights, messages from other users, or other content overlaid on the image. In one example, the system displays overlays based on relevance and importance to a particular user, which can result in different users seeing different overlays on the images.

In one example, a computer vision system can provide visual snapshotting. In one example, the visual snapshotting is persistent visual snapshotting. In one example, the system can perform persistent visual snapshotting. Persistent visual snapshotting refers to the ability of the system to capture, save to, and enable retrieval of a particular snapshot of the image stream in the VIVA index. In one example, the system retrieves related information about the snapshot and not just the snapshot itself. The snapshots can be saved by the user or auto-saved based on criteria configured for the system or configured by the user.

In a retail example of persistent visual snapshots, a user can visually bookmark an image in an image stream of a shelf or a segment, such as a screen snippet, of the shelf. Bookmarking the image saves a copy of the image or image snippet. The user can save the bookmark to save selected items to their wish list, or to enable the user to pause browsing and shopping and return to complete it at a later time. With this capability, the user can access the bookmarked copy and later resume and continue their interaction with it. In effect, the saved copy of the screen behaves as if it were a live copy that is frozen at the point in time when the screen was exited. In one example, the system links the bookmarked snapshot to the current view of the same self, allowing the user to seamlessly continue the experience from where they left off.

In a document screen sharing example of persistent visual snapshots, one or more users in a screen sharing session can close out of the session, including exiting one or more screens in the session. Traditionally such an occurrence would result in other users ("viewers") viewing the closed screen, losing the view of the closed screen. With snapshotting, the system can enable a user to access a saved copy of the screen after the screen has been exited.

In one example, a user initiates the snapshot to be saved. In one example, the system automatically saves a snapshot of the screen upon a user exiting their shared screen. Thus, the user can resume and continue their interaction or screen sharing from the point where they exited. In effect, the saved copy of the screen behaves as if it were a live copy that is frozen at the point in time when the screen was exited.

In one example, the saved screen maintains continuity of the shared screen experience for users who have not exited the session. The system can automatically save the last shared screen image upon a user exiting their shared screen, to enable continuity for other users who are still participating in the screen sharing experience while the exiting user is offline. On the saved screen, users can locate and navigate to a document or locations within documents, or take contextual actions. In one example, the saved snapshot can be linked to the corresponding current image in the stream, to enable the user to seamlessly arrive at the current point in the experience. Thus, persistent saved snapshots can maintain the continuity of the shared screen experience for a group of users, even if one, several, or all the users were to exit the shared screens.

In one example, a computer vision system can synthesize visual events. In one example, the VIVA index enables the system to detect, rank, and synthesize visual events. The system can extract and process event information from the VIVA index. Extracting and processing event information from the VIVA index can enable identification of visual events that span multiple images, determination of the relevance or importance of an event, presentation of relevant event information to users (e.g., display, notify, or alert), and visual summarization of events. All activities and changes causing visual changes to the contents of the images in the image space can be defined as visual events. For example, when a user adds a new paragraph to a screen shared document, the system can determine the relevance of the event, present the information to the users, and provide a visual summary of the information.

In one example, the system detects events and the type of events based on changes in VCs detected across images. For example, when a new item appears on a shelf or a paragraph is deleted, the system can detect the change in VCs in the images, resulting in the identification of an event.

In one example, the system ranks events according to their relevance or importance. For example, the system can determine that highly frequent or small events, or repeating events such as adding words, are not relevant enough to raise to the level of a major event (which may result in a user alert). In contrast, the system can identify a major event when the changes are more significant, such as inserting an entire paragraph in a shared document. In one example, the system can be configured with predefined criteria or user defined criteria. When the criteria are met, such as adding a new document to the VIVA index for a screen sharing user group), the system can determine that the occurrence rises to the level of importance, and can identify it as a major event. Events of different types can be determined to have different levels of importance. For example, changing the title on the first page of a document may be determined more important than editing a few words on the page.

In one example, the system can present events to users ranked by their relative importance. The system could present time sensitive events, for example, to the user via alerts or notifications. In one example, the system can visually synthesize events to include only snapshots reflecting major event checkpoints. For example, the last image frame of a shelf when an item is stationary on the shelf before being picked up, followed by the first image frame after the item completely disappears from view, showing the spot vacated by that item on the shelf, without including all the frames in between. The smaller sets of images can be used to provide the users with a fast playback video showing only key checkpoints, to provide users a mechanism to quickly understand key events.

In one example, a computer vision system can manage visual information and provide privacy protection. In one example, the system provides visual protection of sensitive information and user privacy. Visual protection refers to the ability to prevent the accidental sharing of images or part of images containing sensitive information based on a Visual Advance Check Sensitive Information Detector (VACSID) module. The VACSID module can completely block the image from being sent to a viewer or selectively obscure or filter out parts of the image.

In one example, the VACSID module is a domain specific module to detect certain types of vision characters, determined or defined to be sensitive in nature. In one example, the VACSID module is a detector that includes multiple specialized detectors, able to identify a different type or class of information. The VACSID module can be dedicated module or be integrated into a software module. The one or more detectors of the VACSID module can be implemented as software programs based on a trained neural network or machine learning. In one example, the VACSID module employs OCR technology in cases where the VA includes visual characters that have text characters in them.

In one example of a retail domain, the system can filter an image where the VCs are partially or completely blocked by a user, where the filtered image stream includes only images that do not have any users in them. For example, the system can detect the obstruction by a user and send prior images (such as the last unobstructed image) in the image stream until the obstruction of the products ends. After the obstruction ends, the system can update the information sent in the stream, such as determining that one or more products removed from the shelf by a shopper. In another example, which would be especially useful in a screen sharing domain, the system can include all images in the image stream, but edit images with sensitive information in them. For example, the system can blur, mask, or otherwise prevent the viewing of pixels corresponding to sensitive information.

In an image stream of retail shelves for a retail space open to customers, at some point there will be shoppers in the scene. In such a scenario, the VACSID module can detect and mark images containing shoppers. Depending on factors such as the retailer's privacy policy, the images with shoppers can be blocked from being seen by other viewers. Alternatively, the system can blur or mask the pixels corresponding to the shoppers, or can otherwise obscure or prevent the shoppers from being seen by viewers of the image stream.

In one example, the system can apply a staircase method to detect obstructions to be filtered out. In a staircase approach, the VACSID module can utilize a VAD to detect items on the shelf or detect VCs. The system can apply the information to determine if a user is in front of a shelf. There are three identifiable, VC-based phases in the sequence of image frames that can be used to detect the presence of users in front of a shelf.

Figure 11:
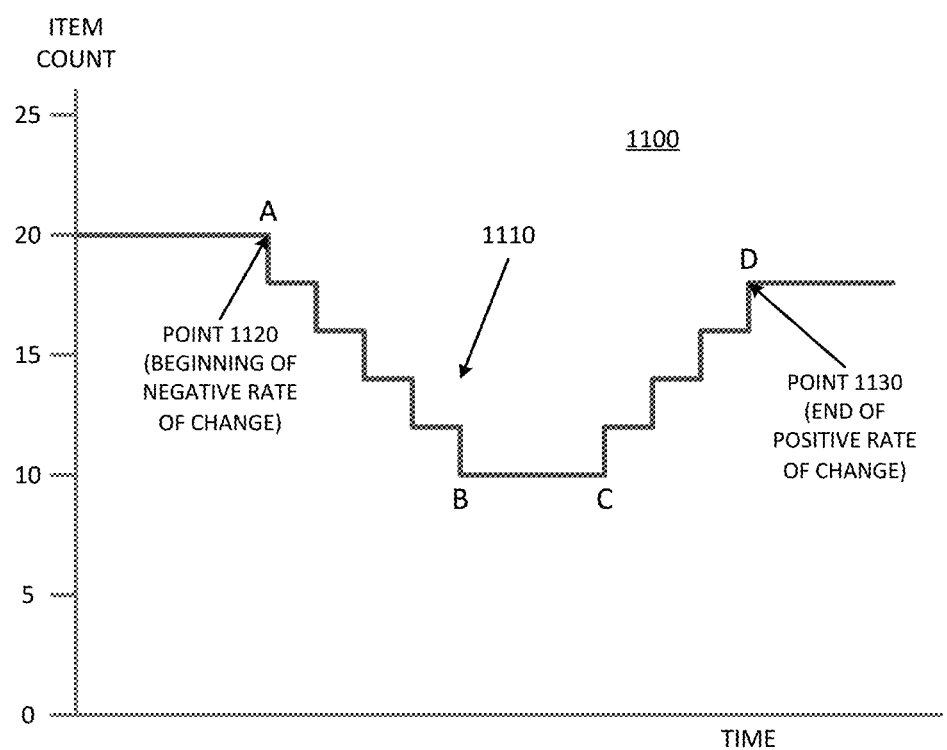
FIG. 11 illustrates a staircase method to detect obstructions to be filtered out.

FIG. 11 illustrates the staircase approach. When a user is in front of a shelf, they occlude one or more items on the shelf, by obstructing the view of the shelf as seen by the cameras. The occlusion of the items causes a sudden disappearance of previously detected items. As a result, the number of visible and detected items (VCs) on a shelf (item count) decreases rapidly. This can be detected as a negative rate of change (negative or downward slope) in item count. In one example, the system detects the onset of a negative rate of change by computation of a deceleration metric.

Diagram 1100 represents a plot of item count versus time, with line 1110 illustrating changes in item count as detected by a computer vision system that monitors the shelf. Line 1110 represents the count of items on a shelf, referring to detected VCs. At point A, the decrease of the count begins. Point 1120 identifies the beginning of the negative rate of change to the count. The decrease continues as the shopper continues to move more fully into the frame of the camera image. The downward sloping period is illustrated by the interval AB. If the shopper stops somewhere in front of the shelf and lingers for some time in front of the shelf (e.g., browsing the shelf), during which time the number of detected items (VCs) is constant or fairly stable (minimal change). The interval where the shopper lingers in front of the shelf is the interval BC in the illustration below.

After the shopper finishes browsing, such as because the shopper has made a decision about a product on the shelf, the shopper moves out of the image frame. As the shopper moves out of the frame, the previously occluded items (VCs) rapidly become visible again. The positive rate of change of the product count begins at point C. The positive slope continues until the item count stabilizes at point D. Thus, the interval CD represents the upward sloping period. Point 1130 identifies the end of the positive rate of change to a stable count over time. In one example, the system detects the end of the positive rate of change by computation of an acceleration metric.

In one example, the system can filter the image stream in response to detection of the negative rate of change in item count, and filter the shopper out of the image stream during the occlusion period BC. Images during the occlusion period correspond to a shopper in front of the shelf and the system can mark the images as sensitive image frames to be removed from the stream. Thus, the staircase approach can achieve filtering of images or filtering of people out of the image streams without using a people detection AI or face detection AI.

In another example, a VACSID module can be a neural network trained to identify people in image frames and mark such image frames for removal. In cases where the VACSID module is a neural network capable of segmenting pixels corresponding to users or people in an image, the pixels can be identified and flagged for blurring or masking before the image is sent to the viewer as part of the image stream. In one example, the system applies either the staircase approach or the neural network detection. In one example, the system applies both the staircase approach and a neural network detection.

In one example of a document screen sharing domain, the system can prevent from screen-sharing an image where VCs representing sensitive information are visible. For example, users may accidentally attempt to share views of sensitive or other personal information, such as an email inbox or a login screen. When a user tries to initiate screen sharing, immediately (typically within fractions of a second) and in advance of the screen sharing getting started, in one example, the VACSID module pre-checks the screen prior to a starting the screen sharing that a user tries to initiate.

If the VACSID module detects VCs that represent sensitive information, the module can interrupt and abort the screen sharing before it can begin. In one example, the user can override the default mechanism to be able to force share the sensitive information. Alternatively, if sensitive information enters the source screen in the midst of a screen sharing session in progress, immediately (e.g., within fractions of a second) and in advance of these images with sensitive information from the source screen being sent to the viewer screen (destination side client screen), the system can interrupt the screen sharing. Thus, the VACSID module ensures that sensitive information that shows up on the source screen is not seen by viewers. In one example, the system can interrupt the screen sharing to indicate the presence of sensitive information and require the user to override the default mechanism to be able to force share the screen.

In some cases, only a part of the screen has sensitive information. For example, when two documents or applications are simultaneously seen in a tiled view or a portion of the document has sensitive information, one of the documents may have sensitive information and the other document does not have sensitive information. In some cases only one portion of a document being shared may have sensitive information. In all these cases, after the system aborts or interrupts the screen share, and if the user chooses to override and force share the screen, the user can be given a choice to apply filters to selectively block (e.g., by masking or blurring) or obscure parts of the screen. Thus, the system can provide an image stream with only the non-sensitive, relevant parts of the source screen visible on the viewer screen.

In some other cases, the user can screen share a document in a browser or other application, which could result in other tabs or bookmarks being visible in the application's user interface, which the user may not prefer to include in the screen share. In such cases, the VACSID module can provide the user the option to filter out and block (e.g., masking or blurring the image) the parts of the screen before screen sharing. Thus, the screen sharing can share only the essential and relevant part of the screen.

In some implementations, the user can select the types of information to filter out for a screen share or trigger an interruption of the screen share. In one example, the user can select the types of information to ignore (e.g., to pass through without interruption) from a defined set of the types of such information. The user can also define new custom types of information to be filtered out for screen sharing, or to trigger an interruption of the screen sharing.

Figure 12:
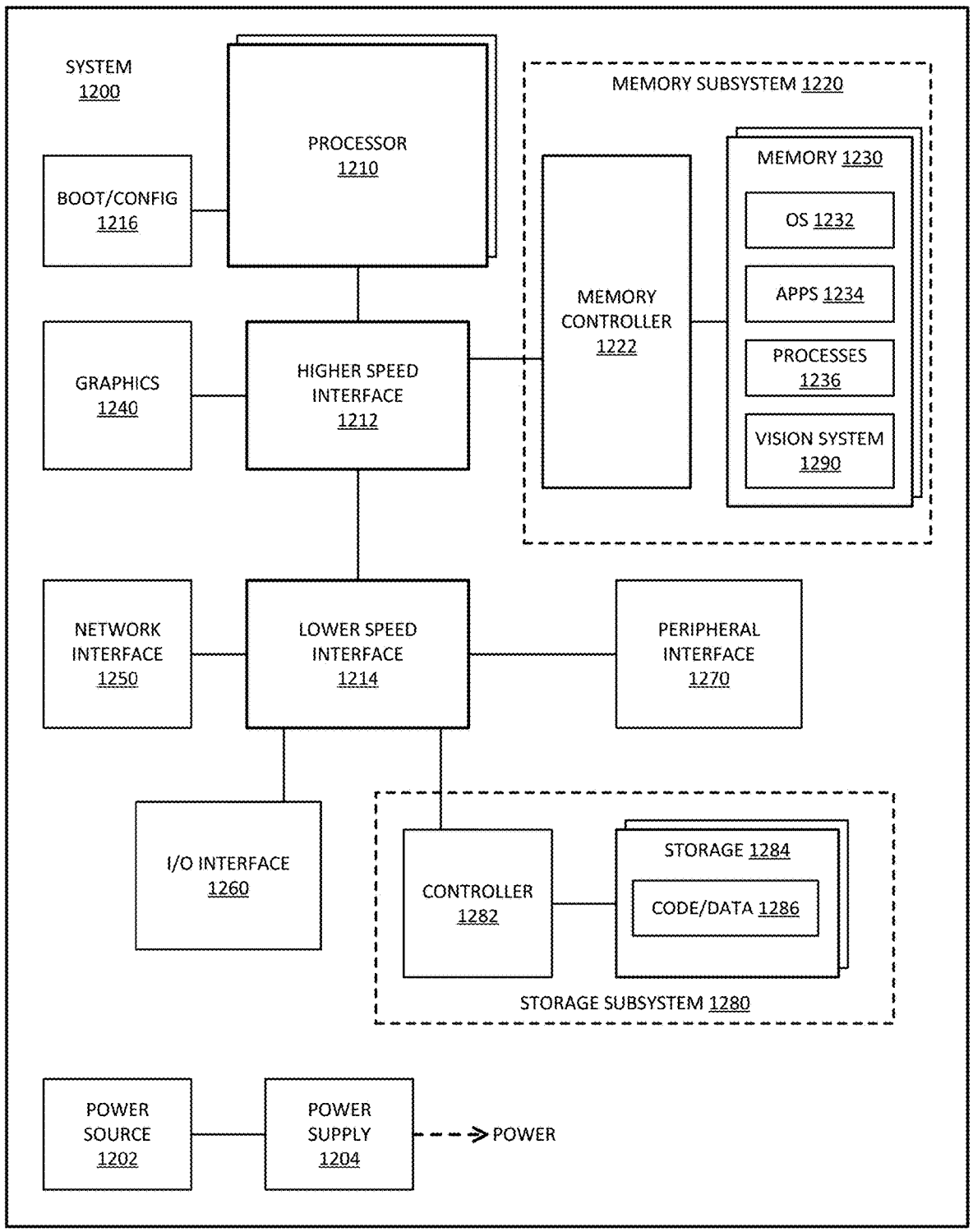
FIG. 12 is a block diagram of an example of a computing system in which a computer vision based user environment can be implemented.

FIG. 12 is a block diagram of an example of a computing system in which a computer vision based user environment can be implemented. System 1200 represents a computing device in accordance with any example herein, and can be a laptop computer, a desktop computer, a server, or other electronic device that can execute vision system.

In one example, system 1200 includes vision system 1290. Vision system 1290 is represented in memory 1230, in that components of the vision system can be implemented in software modules to be executed by processor 1210. The combination of processor 1210 executing the modules can represent a vision system controller. Vision system 1290 receives visual input, such as image streams or image data. In one example, the image stream is a stream of images from a retail environment. In one example, the image stream is a stream of images from a document sharing or workspace sharing environment. Vision system 1290 processes the visual information, identifies visual characters based on a vision alphabet, and processes an output image to send to a user device. The output image includes interactive bounded areas to enable a user to interact with the output image or output image stream. The vision system can perform any type of analysis or visual processing described.

System 1200 includes processor 1210 can include any type of microprocessor, central processing unit (CPU), graphics processing unit (GPU), processing core, or other processing hardware, or a combination, to provide processing or execution of instructions for system 1200. Processor 1210 can be a host processor device. Processor 1210 controls the overall operation of system 1200, and can be or include, one or more programmable general-purpose or special-purpose microprocessors, digital signal processors (DSPs), programmable controllers, application specific integrated circuits (ASICs), programmable logic devices (PLDs), or a combination of such devices.

System 1200 includes boot/config 1216, which represents storage to store boot code (e.g., basic input/output system (BIOS)), configuration settings, security hardware (e.g., trusted platform module (TPM)), or other system level hardware that operates outside of a host OS. Boot/config 1216 can include a nonvolatile storage device, such as read-only memory (ROM), flash memory, or other memory devices.

In one example, system 1200 includes interface 1212 coupled to processor 1210, which can represent a higher speed interface or a high throughput interface for system components that need higher bandwidth connections, such as memory subsystem 1220 or graphics interface components 1240. Interface 1212 represents an interface circuit, which can be a standalone component or integrated onto a processor die. Interface 1212 can be integrated as a circuit onto the processor die or integrated as a component on a system on a chip. Where present, graphics interface 1240 interfaces to graphics components for providing a visual display to a user of system 1200. Graphics interface 1240 can be a standalone component or integrated onto the processor die or system on a chip. In one example, graphics interface 1240 can drive a high definition (HD) display or ultra high definition (UHD) display that provides an output to a user. In one example, the display can include a touchscreen display. In one example, graphics interface 1240 generates a display based on data stored in memory 1230 or based on operations executed by processor 1210 or both.

Memory subsystem 1220 represents the main memory of system 1200, and provides storage for code to be executed by processor 1210, or data values to be used in executing a routine. Memory subsystem 1220 can include one or more varieties of random-access memory (RAM) such as DRAM, 3DXP (three-dimensional crosspoint), or other memory devices, or a combination of such devices. Memory 1230 stores and hosts, among other things, operating system (OS) 1232 to provide a software platform for execution of instructions in system 1200. Additionally, applications 1234 can execute on the software platform of OS 1232 from memory 1230. Applications 1234 represent programs that have their own operational logic to perform execution of one or more functions. Processes 1236 represent agents or routines that provide auxiliary functions to OS 1232 or one or more applications 1234 or a combination. OS 1232, applications 1234, and processes 1236 provide software logic to provide functions for system 1200. In one example, memory subsystem 1220 includes memory controller 1222, which is a memory controller to generate and issue commands to memory 1230. It will be understood that memory controller 1222 could be a physical part of processor 1210 or a physical part of interface 1212. For example, memory controller 1222 can be an integrated memory controller, integrated onto a circuit with processor 1210, such as integrated onto the processor die or a system on a chip.

While not specifically illustrated, it will be understood that system 1200 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or other bus, or a combination.

In one example, system 1200 includes interface 1214, which can be coupled to interface 1212. Interface 1214 can be a lower speed interface than interface 1212. In one example, interface 1214 represents an interface circuit, which can include standalone components and integrated circuitry. In one example, multiple user interface components or peripheral components, or both, couple to interface 1214. Network interface 1250 provides system 1200 the ability to communicate with remote devices (e.g., servers or other computing devices) over one or more networks. Network interface 1250 can include an Ethernet adapter, wireless interconnection components, cellular network interconnection components, USB (universal serial bus), or other wired or wireless standards-based or proprietary interfaces. Network interface 1250 can exchange data with a remote device, which can include sending data stored in memory or receiving data to be stored in memory.

In one example, system 1200 includes one or more input/output (I/O) interface(s) 1260. I/O interface 1260 can include one or more interface components through which a user interacts with system 1200 (e.g., audio, alphanumeric, tactile/touch, or other interfacing). Peripheral interface 1270 can include any hardware interface not specifically mentioned above. Peripherals refer generally to devices that connect dependently to system 1200. A dependent connection is one where system 1200 provides the software platform or hardware platform or both on which operation executes, and with which a user interacts.

In one example, system 1200 includes storage subsystem 1280 to store data in a nonvolatile manner. In one example, in certain system implementations, at least certain components of storage 1280 can overlap with components of memory subsystem 1220. Storage subsystem 1280 includes storage device(s) 1284, which can be or include any conventional medium for storing large amounts of data in a nonvolatile manner, such as one or more magnetic, solid state, NAND, or optical based disks, or a combination. Storage 1284 holds code or instructions and data 1286 in a persistent state (i.e., the value is retained despite interruption of power to system 1200). Storage 1284 can be generically considered to be a "memory," although memory 1230 is typically the executing or operating memory to provide instructions to processor 1210. Whereas storage 1284 is nonvolatile, memory 1230 can include volatile memory (i.e., the value or state of the data is indeterminate if power is interrupted to system 1200). In one example, storage subsystem 1280 includes controller 1282 to interface with storage 1284. In one example controller 1282 is a physical part of interface 1214 or processor 1210, or can include circuits or logic in both processor 1210 and interface 1214.

Power source 1202 provides power to the components of system 1200. More specifically, power source 1202 typically interfaces to one or multiple power supplies 1204 in system 1200 to provide power to the components of system 1200. In one example, power supply 1204 includes an AC to DC (alternating current to direct current) adapter to plug into a wall outlet. Such AC power can be renewable energy (e.g., solar power) power source 1202. In one example, power source 1202 includes a DC power source, such as an external AC to DC converter. In one example, power source 1202 or power supply 1204 includes wireless charging hardware to charge via proximity to a charging field. In one example, power source 1202 can include an internal battery or fuel cell source.

Figure 13:
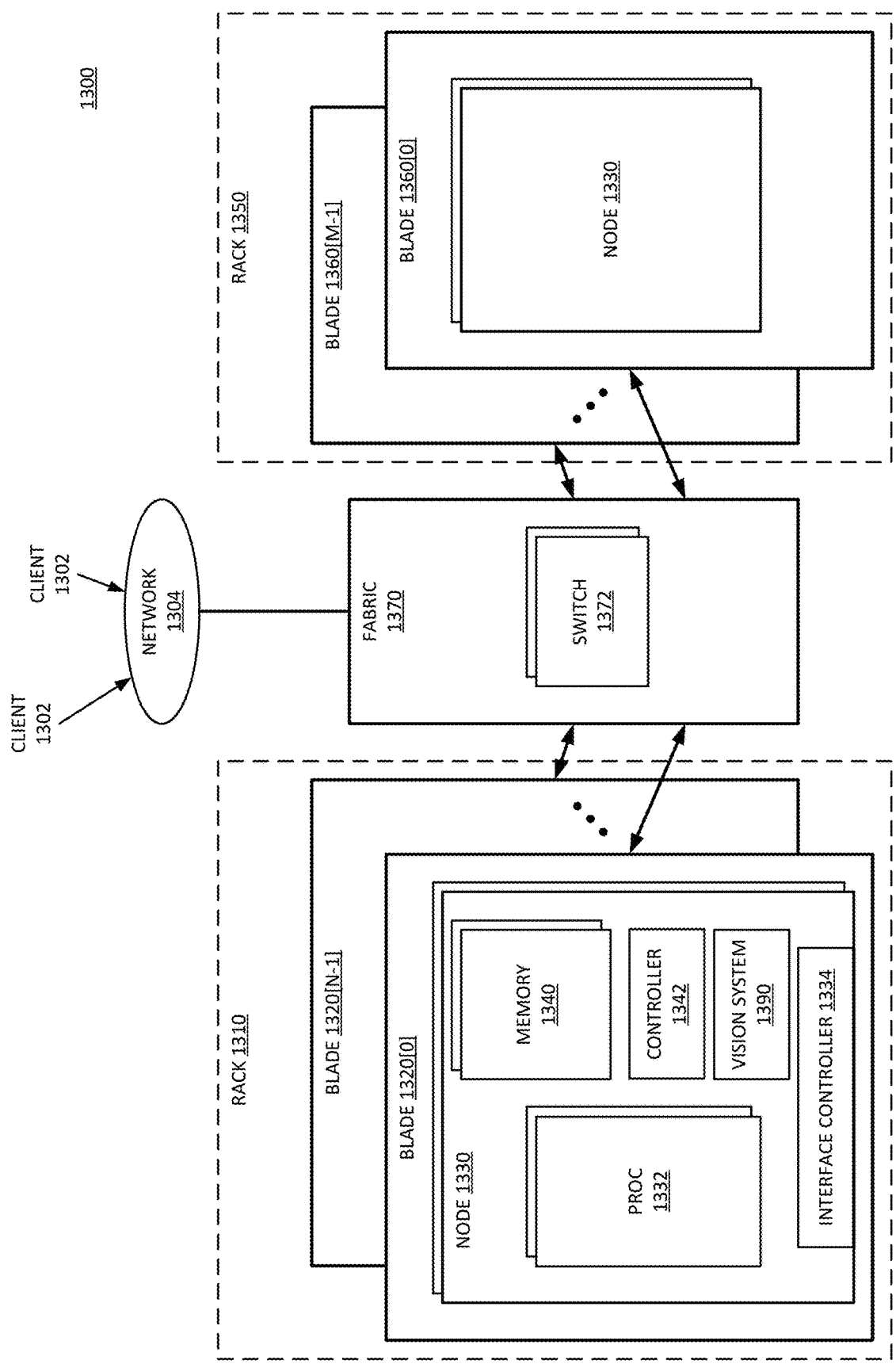
FIG. 13 is a block diagram of an example of a multi-node network in which a computer vision based user environment can be implemented.

FIG. 13 is a block diagram of an example of a multi-node network in which a computer vision based user environment can be implemented. In one example, system 1300 represents a server farm. In one example, system 1300 represents a data cloud or a processing cloud. Nodes 1330 of system 1300 represent hardware that can execute a computer vision system that performs operations based on a vision alphabet in accordance with any example herein. Node 1330 includes memory 1340. Node 1330 includes controller 1342, which represents a memory controller to manage access to memory 1340.

In one example, system 1300 includes vision system 1390. Vision system 1390 receives visual input, such as image streams or image data. In one example, the image stream is a stream of images from a retail environment. In one example, the image stream is a stream of images from a document sharing or workspace sharing environment. Vision system 1390 processes the visual information, identifies visual characters based on a vision alphabet, and processes an output image to send to a user device. The output image includes interactive bounded areas to enable a user to interact with the output image or output image stream. The vision system can perform any type of analysis or visual processing described.

One or more clients 1302 make requests over network 1304 to system 1300. Network 1304 represents one or more local networks, or wide area networks, or a combination. Clients 1302 can be human or machine clients, which generate requests for the execution of operations by system 1300. System 1300 executes applications or data computation tasks requested by clients 1302.

In one example, system 1300 includes one or more racks, which represent structural and interconnect resources to house and interconnect multiple computation nodes. In one example, rack 1310 includes multiple nodes 1330. In one example, rack 1310 hosts multiple blade components 1320. Hosting refers to providing power, structural or mechanical support, and interconnection. Blades 1320 can refer to computing resources on printed circuit boards (PCBs), where a PCB houses the hardware components for one or more nodes 1330. In one example, blades 1320 do not include a chassis or housing or other "box" other than that provided by rack 1310. In one example, blades 1320 include housing with exposed connector to connect into rack 1310. In one example, system 1300 does not include rack 1310, and each blade 1320 includes a chassis or housing that can stack or otherwise reside in close proximity to other blades and allow interconnection of nodes 1330.

System 1300 includes fabric 1370, which represents one or more interconnectors for nodes 1330. In one example, fabric 1370 includes multiple switches 1372 or routers or other hardware to route signals among nodes 1330. Additionally, fabric 1370 can couple system 1300 to network 1304 for access by clients 1302. In addition to routing equipment, fabric 1370 can be considered to include the cables or ports or other hardware equipment to couple nodes 1330 together. In one example, fabric 1370 has one or more associated protocols to manage the routing of signals through system 1300. In one example, the protocol or protocols is at least partly dependent on the hardware equipment used in system 1300.

As illustrated, rack 1310 includes N blades 1320. In one example, in addition to rack 1310, system 1300 includes rack 1350. As illustrated, rack 1350 includes M blades 1360. M is not necessarily the same as N; thus, it will be understood that various different hardware equipment components could be used, and coupled together into system 1300 over fabric 1370. Blades 1360 can be the same or similar to blades 1320. Nodes 1330 can be any type of node and are not necessarily all the same type of node. System 1300 is not limited to being homogenous, nor is it limited to not being homogenous.

For simplicity, only the node in blade 1320 [0] is illustrated in detail. However, other nodes in system 1300 can be the same or similar. At least some nodes 1330 are computation nodes, with processor (proc) 1332 and memory 1340. A computation node refers to a node with processing resources (e.g., one or more processors) that executes an operating system and can receive and process one or more tasks. In one example, at least some nodes 1330 are server nodes with a server as processing resources represented by processor 1332 and memory 1340. A storage server refers to a node with more storage resources than a computation node, and rather than having processors for the execution of tasks, a storage server includes processing resources to manage access to the storage nodes within the storage server.

In one example, node 1330 includes interface controller 1334, which represents logic to control access by node 1330 to fabric 1370. The logic can include hardware resources to interconnect to the physical interconnection hardware. The logic can include software or firmware logic to manage the interconnection. In one example, interface controller 1334 is or includes a host fabric interface, which can be a fabric interface in accordance with any example described herein.

Processor 1332 can include one or more separate processors. Each separate processor can include a single processing unit, a multicore processing unit, or a combination. The processing unit can be a primary processor such as a CPU (central processing unit), a peripheral processor such as a GPU (graphics processing unit), or a combination. The memory system can include memory devices represented by memory 1340 and a memory controller represented by controller 1342.

In one aspect, a system includes: a memory to store code to execute a computer vision processing system; a network interface to receive a video stream from a client device; and a processor to execute the computer vision processing system, including to identify in the video stream a computer vision character of a vision alphabet, wherein the vision alphabet includes a collection of computer vision characters, and wherein each computer vision character has a distinctive characteristic identifiable by the computer vision processing system; and process an image of the video stream to provide to a user device a function associated with the identified computer vision character, the processing including to make a bounded space within the video stream corresponding to the identified computer vision character interactive on the user device, to provide the function in response to interaction with the bounded space at the user device.

The system can be, for example, hardware resources of a cloud server architecture. A cloud server architecture includes shared hardware resources, including processors, memory, and networking hardware, on which instances of software systems can be executed. The hardware environment can further include accelerators or other compute logic to perform specific compute functions. The computing device can alternatively be a standalone server device or server environment (which can include many hardware devices, such as a rack) that is dedicated to executing the computer vision processing system.

In one example, identify the computer vision character comprises analyze the video stream with a computer vision neural network. In one example, the identified computer vision character comprises a first computer vision character, and wherein to analyze the video stream comprises identify a second computer vision character that matches the first computer vision character, and has a different scale. In one example, the computer vision processing system is to: link the first computer vision character and the second computer vision character. In one example, identify the computer vision character comprises add the identified computer vision character to an index of computer vision characters detected in the video stream. In one example, the index comprises an index of computer vision characters from the video stream and at least one other video stream of an environment monitored by multiple separate video streams. In one example, the vision processing system is to include in the index external information related to the vision character that is received from the user device that is not derived by the computer vision processing system. In one example, the computer vision processing system is to send the processed image of the video stream to the user device to provide the function associated with the identified computer vision character. In one example, the computer vision processing system is to send information to the user device based on the processed image of the video stream, to provide information related to the computer vision character identified in the video stream. In one example, the computer vision processing system is to send the image overlay information to the user device based on the processed image of the video stream, to provide the function associated with the identified computer vision character, and to send the received video stream to the user device. In one example, the computer vision processing system is to send a portion of the processed image of the video stream to the user device, to provide the function associated with the identified computer vision character. In one example, the user device comprises a personal computing device. In one example, the user device comprises a cloud terminal that a user accesses remotely from a personal computing device.

In one example, the video stream comprises video of a shared workspace within a screen image of a user device. In one example, identify the computer vision character comprises identify an identifiable element of a electronic document or cloud-based shared document. In one example, the identifiable element of the electronic document or cloud-based shared document comprises a title, a line, a header, a footer, a page number, a user icon, or a paragraph of the shared document, wherein to provide the function associated with the vision character comprises provide a link to edit the identifiable element within the shared document, provide a link to send a message related to the identifiable element, or provide a link to navigate within the shared document. In one example, the computer vision processing system is to send the video stream to the user device, including to send a stream of different views from one or multiple different user devices. In one example, the computer vision processing system is to send the video stream to the user device, including to send a visual snapshot of the shared workspace, and then update the content objects based on updates to the content objects since the visual snapshot was taken. In one example, identify the computer vision character comprises identify an identifiable element of a webpage. In one example, the identifiable element of the webpage comprises a universal resource locator (URL), an input box, a hyperlink, menu items, actionable drop downs, buttons, communication icons, messaging icons, or a user icon. In one example, provide the function associated with the identifiable element comprises provide a click-through link to the identifiable element. In one example, the computer vision processing system is to send the video stream of the shared workspace including to filter from the video stream the screen image or a portion of the screen image that includes sensitive user information. In one example, the video stream comprises video of a retail shelf, and wherein the identified computer vision character comprises a product on the retail shelf. In one example, the product comprises a first product, and further comprising the computer vision processing system to identify a second product as a second computer vision character in the video stream; and identify the retail shelf as a composite object having the first computer vision character and the second computer vision character. In one example, provide the function associated with the product comprises provide a link to the product. In one example, provide the link comprises provide an embedded link to a page of information about the product, provide an embedded link to a function to add the product to a virtual shopping cart, or provide an embedded link to an image object. In one example, the computer vision processing system is to send the processed video stream of the retail shelf having the product in response to a user selection from a page of information about the product. In one example, the computer vision processing system is to send the processed video stream of the retail shelf having the product in response to a query about the product from the user device. In one example, the computer vision processing system is to send the video stream of the retail shelf to the user device, including to filter or remove transient changes from the video stream to present a view of the product unobstructed by a realtime transient obstruction of the product on the retail shelf.

In one example of the system, to identify the computer vision character comprises analyze the video stream with a computer vision neural network. In accordance with any preceding example of the system, in one example, the identified computer vision character comprises a first computer vision character, and wherein to analyze the video stream comprises identify a second computer vision character that matches the first computer vision character, and has a different scale. In accordance with any preceding example of the system, in one example, the computer vision processing system is to: link the first computer vision character and the second computer vision character. In accordance with any preceding example of the system, in one example, to identify the computer vision character comprises add the identified computer vision character to an index of computer vision characters detected in the video stream. In accordance with any preceding example of the system, in one example, the index comprises an index of computer vision characters from the video stream and at least one other video stream of an environment monitored by multiple separate video streams. In accordance with any preceding example of the system, in one example, the vision processing system is to include in the index external information related to the vision character that is received from the user device that is not derived by the computer vision processing system. In accordance with any preceding example of the system, in one example, the computer vision processing system is to send the processed image of the video stream to the user device to provide the function associated with the identified computer vision character. In accordance with any preceding example of the system, in one example, the computer vision processing system is to send information to the user device based on the processed image of the video stream, to provide information about the computer vision character identified in the video stream. In accordance with any preceding example of the system, in one example, the computer vision processing system is to send the image overlay information to the user device based on the processed image of the video stream, to provide the function associated with the identified computer vision character, and to send the received video stream to the user device. In accordance with any preceding example of the system, in one example, the computer vision processing system is to send a portion of the processed image of the video stream to the user device, to provide the function associated with the identified computer vision character. In accordance with any preceding example of the system, in one example, the user device comprises a personal computing device. In accordance with any preceding example of the system, in one example, the user device comprises a cloud terminal that a user accesses remotely from a personal computing device. In accordance with any preceding example of the system, in one example, the video stream comprises video of a retail shelf, and wherein the identified computer vision character comprises a product on the retail shelf. In accordance with any preceding example of the system, in one example, the product comprises a first product, and further comprising the computer vision processing system to identify a second product as a second computer vision character in the video stream; and identify the retail shelf as a composite object having the first computer vision character and the second computer vision character. In accordance with any preceding example of the system, in one example, to provide the function associated with the product comprises provide a link to the product. In accordance with any preceding example of the system, in one example, to provide the link comprises provide an embedded link to a page of information about the product, provide an embedded link to a function to add the product to a virtual shopping cart, or provide an embedded link to an image object. In accordance with any preceding example of the system, in one example, the computer vision processing system is to send the processed video stream of the retail shelf having the product in response to a user selection from a page of information about the product. In accordance with any preceding example of the system, in one example, the computer vision processing system is to send the processed video stream of the retail shelf having the product in response to a query about the product from the user device. In accordance with any preceding example of the system, in one example, the computer vision processing system is to send the video stream of the retail shelf to the user device, including to filter transient changes from the video stream to present a view of the product unobstructed by a realtime transient obstruction of the product on the retail shelf. In accordance with any preceding example of the system, in one example, the video stream comprises video of a shared workspace within a screen image of a user device. In accordance with any preceding example of the system, in one example, to identify the computer vision character comprises identify an identifiable element of a electronic document or cloud-based shared document. In accordance with any preceding example of the system, in one example, the identifiable element of the electronic document or cloud-based shared document comprises a title, a line, a header, a footer, a page number, a user icon, or a paragraph of the shared document, wherein to provide the function associated with the vision character comprises provide a link to edit the identifiable element within the shared document, provide a link to send a message related to the identifiable element, or provide a link to navigate within the shared document. In accordance with any preceding example of the system, in one example, the computer vision processing system is to send the video stream to the user device, including to send a stream of different views from one or multiple different user devices. In accordance with any preceding example of the system, in one example, the computer vision processing system is to send the video stream to the user device, including to send a visual snapshot of the shared workspace, and then update the content objects based on updates to the content objects since the visual snapshot was taken. In accordance with any preceding example of the system, in one example, to identify the computer vision character comprises identify an identifiable element of a webpage. In accordance with any preceding example of the system, in one example, the identifiable element of the webpage comprises a universal resource locator (URL), an input box, a hyperlink, menu items, actionable drop-downs, buttons, communication icons, messaging icons, or a user icon. In accordance with any preceding example of the system, in one example, to provide the function associated with the identifiable element comprises provide a click-through link to the identifiable element. In accordance with any preceding example of the system, in one example, the computer vision processing system is to send the video stream of the shared workspace including to filter from the video stream the screen image or a portion of the screen image that includes sensitive user information.

In one aspect, a method includes: identifying in a video stream a computer vision character of a vision alphabet, wherein the vision alphabet includes a collection of computer vision characters, and wherein each computer vision character has a distinctive characteristic identifiable by the computer vision processing system; and processing an image of the video stream to provide to a user device a function associated with the identified computer vision character, the processing including to make a bounded space within the video stream corresponding to the identified computer vision character interactive on the user device, to provide the function in response to interaction with the bounded space at the user device.

In one example of the method, identifying the computer vision character comprises analyzing the video stream with a computer vision neural network. In accordance with any preceding example of the method, in one example, the identified computer vision character comprises a first computer vision character, and wherein analyzing the video stream comprises identifying a second computer vision character that matches the first computer vision character, and has a different scale. In accordance with any preceding example of the method, in one example, the method includes: linking the first computer vision character and the second computer vision character. In accordance with any preceding example of the method, in one example, identifying the computer vision character comprises adding the identified computer vision character to an index of computer vision characters detected in the video stream. In accordance with any preceding example of the method, in one example, the index comprises an index of computer vision characters from the video stream and at least one other video stream of an environment monitored by multiple separate video streams. In accordance with any preceding example of the method, in one example, the vision processing system is to include in the index external information related to the vision character that is received from the user device that is not derived by the computer vision processing system. In accordance with any preceding example of the method, in one example, the computer vision processing system is to send the processed image of the video stream to the user device to provide the function associated with the identified computer vision character. In accordance with any preceding example of the method, in one example, the computer vision processing system is to send information to the user device based on the processed image of the video stream, to provide information about the computer vision character identified in the video stream. In accordance with any preceding example of the method, in one example, the computer vision processing system is to send the image overlay information to the user device based on the processed image of the video stream, to provide the function associated with the identified computer vision character, and to send the received video stream to the user device. In accordance with any preceding example of the method, in one example, the computer vision processing system is to send a portion of the processed image of the video stream to the user device, to provide the function associated with the identified computer vision character. In accordance with any preceding example of the method, in one example, the user device comprises a personal computing device. In accordance with any preceding example of the method, in one example, the user device comprises a cloud terminal that a user accesses remotely from a personal computing device. In accordance with any preceding example of the method, in one example, the video stream comprises video of a retail shelf, and wherein the identified computer vision character comprises a product on the retail shelf. In accordance with any preceding example of the method, in one example, the product comprises a first product, and further comprising identifying a second product as a second computer vision character in the video stream; and identifying the retail shelf as a composite object having the first computer vision character and the second computer vision character. In accordance with any preceding example of the method, in one example, providing the function associated with the product comprises providing a link to the product. In accordance with any preceding example of the method, in one example, providing the link comprises providing an embedded link to a page of information about the product, provide an embedded link to a function to add the product to a virtual shopping cart, or provide an embedded link to an image object. In accordance with any preceding example of the method, in one example, the computer vision processing system is to send the processed video stream of the retail shelf having the product in response to a user selection from a page of information about the product. In accordance with any preceding example of the method, in one example, the computer vision processing system is to send the processed video stream of the retail shelf having the product in response to a query about the product from the user device. In accordance with any preceding example of the method, in one example, the computer vision processing system is to send the video stream of the retail shelf to the user device, including to filter transient changes from the video stream to present a view of the product unobstructed by a realtime transient obstruction of the product on the retail shelf. In accordance with any preceding example of the method, in one example, the video stream comprises video of a shared workspace within a screen image of a user device. In accordance with any preceding example of the method, in one example, identifying the computer vision character comprises identifying an identifiable element of a electronic document or cloud-based shared document. In accordance with any preceding example of the method, in one example, the identifiable element of the electronic document or cloud-based shared document comprises a title, a line, a header, a footer, a page number, a user icon, or a paragraph of the shared document, wherein to provide the function associated with the vision character comprises provide a link to edit the identifiable element within the shared document, provide a link to send a message related to the identifiable element, or provide a link to navigate within the shared document. In accordance with any preceding example of the method, in one example, the computer vision processing system is to send the video stream to the user device, including to send a stream of different views from one or multiple different user devices. In accordance with any preceding example of the method, in one example, the computer vision processing system is to send the video stream to the user device, including to send a visual snapshot of the shared workspace, and then update the content objects based on updates to the content objects since the visual snapshot was taken. In accordance with any preceding example of the method, in one example, identifying the computer vision character comprises identifying an identifiable element of a webpage. In accordance with any preceding example of the method, in one example, the identifiable element of the webpage comprises a universal resource locator (URL), an input box, a hyperlink, menu items, actionable drop-downs, buttons, communication icons, messaging icons, or a user icon. In accordance with any preceding example of the method, in one example, providing the function associated with the identifiable element comprises providing a click-through link to the identifiable element. In accordance with any preceding example of the method, in one example, the computer vision processing system is to send the video stream of the shared workspace including to filter from the video stream the screen image or a portion of the screen image that includes sensitive user information.

In one aspect, an apparatus includes a computer readable medium having content stored thereon, which when executed, causes a machine to perform operations including: identifying in a video stream a computer vision character of a vision alphabet, wherein the vision alphabet includes a collection of computer vision characters, and wherein each computer vision character has a distinctive characteristic identifiable by the computer vision processing system; and processing an image of the video stream to provide to a user device a function associated with the identified computer vision character, the processing including to make a bounded space within the video stream corresponding to the identified computer vision character interactive on the user device, to provide the function in response to interaction with the bounded space at the user device.

In one example of the apparatus, identifying the computer vision character comprises analyzing the video stream with a computer vision neural network. In accordance with any preceding example of the apparatus, in one example, the identified computer vision character comprises a first computer vision character, and wherein analyzing the video stream comprises identifying a second computer vision character that matches the first computer vision character, and has a different scale. In accordance with any preceding example of the apparatus, in one example, the apparatus includes: linking the first computer vision character and the second computer vision character. In accordance with any preceding example of the apparatus, in one example, identifying the computer vision character comprises adding the identified computer vision character to an index of computer vision characters detected in the video stream. In accordance with any preceding example of the apparatus, in one example, the index comprises an index of computer vision characters from the video stream and at least one other video stream of an environment monitored by multiple separate video streams. In accordance with any preceding example of the apparatus, in one example, the vision processing system is to include in the index external information related to the vision character that is received from the user device that is not derived by the computer vision processing system. In accordance with any preceding example of the apparatus, in one example, the computer vision processing system is to send the processed image of the video stream to the user device to provide the function associated with the identified computer vision character. In accordance with any preceding example of the apparatus, in one example, the computer vision processing system is to send information to the user device based on the processed image of the video stream, to provide information about the computer vision character identified in the video stream. In accordance with any preceding example of the apparatus, in one example, the computer vision processing system is to send the image overlay information to the user device based on the processed image of the video stream, to provide the function associated with the identified computer vision character, and to send the received video stream to the user device. In accordance with any preceding example of the apparatus, in one example, the computer vision processing system is to send a portion of the processed image of the video stream to the user device, to provide the function associated with the identified computer vision character. In accordance with any preceding example of the apparatus, in one example, the user device comprises a personal computing device. In accordance with any preceding example of the apparatus, in one example, the user device comprises a cloud terminal that a user accesses remotely from a personal computing device. In accordance with any preceding example of the apparatus, in one example, the video stream comprises video of a retail shelf, and wherein the identified computer vision character comprises a product on the retail shelf. In accordance with any preceding example of the apparatus, in one example, the product comprises a first product, and further comprising identifying a second product as a second computer vision character in the video stream; and identifying the retail shelf as a composite object having the first computer vision character and the second computer vision character. In accordance with any preceding example of the apparatus, in one example, providing the function associated with the product comprises providing a link to the product. In accordance with any preceding example of the apparatus, in one example, providing the link comprises providing an embedded link to a page of information about the product, provide an embedded link to a function to add the product to a virtual shopping cart, or provide an embedded link to an image object. In accordance with any preceding example of the apparatus, in one example, the computer vision processing system is to send the processed video stream of the retail shelf having the product in response to a user selection from a page of information about the product. In accordance with any preceding example of the apparatus, in one example, the computer vision processing system is to send the processed video stream of the retail shelf having the product in response to a query about the product from the user device. In accordance with any preceding example of the apparatus, in one example, the computer vision processing system is to send the video stream of the retail shelf to the user device, including to filter transient changes from the video stream to present a view of the product unobstructed by a realtime transient obstruction of the product on the retail shelf. In accordance with any preceding example of the apparatus, in one example, the video stream comprises video of a shared workspace within a screen image of a user device. In accordance with any preceding example of the apparatus, in one example, identifying the computer vision character comprises identifying an identifiable element of a electronic document or cloud-based shared document. In accordance with any preceding example of the apparatus, in one example, the identifiable element of the electronic document or cloud-based shared document comprises a title, a line, a header, a footer, a page number, a user icon, or a paragraph of the shared document, wherein to provide the function associated with the vision character comprises provide a link to edit the identifiable element within the shared document, provide a link to send a message related to the identifiable element, or provide a link to navigate within the shared document. In accordance with any preceding example of the apparatus, in one example, the computer vision processing system is to send the video stream to the user device, including to send a stream of different views from one or multiple different user devices. In accordance with any preceding example of the apparatus, in one example, the computer vision processing system is to send the video stream to the user device, including to send a visual snapshot of the shared workspace, and then update the content objects based on updates to the content objects since the visual snapshot was taken. In accordance with any preceding example of the apparatus, in one example, identifying the computer vision character comprises identifying an identifiable element of a webpage. In accordance with any preceding example of the apparatus, in one example, the identifiable element of the webpage comprises a universal resource locator (URL), an input box, a hyperlink, menu items, actionable drop-downs, buttons, communication icons, messaging icons, or a user icon. In accordance with any preceding example of the apparatus, in one example, providing the function associated with the identifiable element comprises providing a click-through link to the identifiable element. In accordance with any preceding example of the apparatus, in one example, the computer vision processing system is to send the video stream of the shared workspace including to filter from the video stream the screen image or a portion of the screen image that includes sensitive user information.

In one aspect, an apparatus includes: means for identifying in a video stream a computer vision character of a vision alphabet, wherein the vision alphabet includes a collection of computer vision characters, and wherein each computer vision character has a distinctive characteristic identifiable by the computer vision processing system; and means for processing an image of the video stream to provide to a user device a function associated with the identified computer vision character, the processing including to make a bounded space within the video stream corresponding to the identified computer vision character interactive on the user device, to provide the function in response to interaction with the bounded space at the user device.

In one example of the apparatus, the means for identifying the computer vision character comprises analyzing the video stream with a computer vision neural network. In accordance with any preceding example of the apparatus, in one example, the identified computer vision character comprises a first computer vision character, and wherein the means for analyzing the video stream comprises means for identifying a second computer vision character that matches the first computer vision character, and has a different scale. In accordance with any preceding example of the apparatus, in one example, the apparatus includes: means for linking the first computer vision character and the second computer vision character. In accordance with any preceding example of the apparatus, in one example, the means for identifying the computer vision character comprises means for adding the identified computer vision character to an index of computer vision characters detected in the video stream. In accordance with any preceding example of the apparatus, in one example, the index comprises an index of computer vision characters from the video stream and at least one other video stream of an environment monitored by multiple separate video streams. In accordance with any preceding example of the apparatus, in one example, including means for including in the index external information related to the vision character that is received from the user device that is not derived by the computer vision processing system. In accordance with any preceding example of the apparatus, in one example, including means for sending the processed image of the video stream to the user device to provide the function associated with the identified computer vision character. In accordance with any preceding example of the apparatus, in one example, including means for sending information to the user device based on the processed image of the video stream, to provide information about the computer vision character identified in the video stream. In accordance with any preceding example of the apparatus, in one example, including means for sending the image overlay information to the user device based on the processed image of the video stream, to provide the function associated with the identified computer vision character, and means for sending the received video stream to the user device. In accordance with any preceding example of the apparatus, in one example, including means for sending a portion of the processed image of the video stream to the user device, to provide the function associated with the identified computer vision character. In accordance with any preceding example of the apparatus, in one example, the user device comprises a personal computing device. In accordance with any preceding example of the apparatus, in one example, the user device comprises a cloud terminal that a user accesses remotely from a personal computing device. In accordance with any preceding example of the apparatus, in one example, the video stream comprises video of a retail shelf, and wherein the identified computer vision character comprises a product on the retail shelf. In accordance with any preceding example of the apparatus, in one example, the product comprises a first product, and further comprising means for identifying a second product as a second computer vision character in the video stream; and means for identifying the retail shelf as a composite object having the first computer vision character and the second computer vision character. In accordance with any preceding example of the apparatus, in one example, the means for providing the function associated with the product comprises providing a link to the product. In accordance with any preceding example of the apparatus, in one example, the means for providing the link comprises means for providing an embedded link to a page of information about the product, means for providing an embedded link to a function to add the product to a virtual shopping cart, or means for providing an embedded link to an image object. In accordance with any preceding example of the apparatus, in one example, including means for sending the processed video stream of the retail shelf having the product in response to a user selection from a page of information about the product. In accordance with any preceding example of the apparatus, in one example, including means for sending the processed video stream of the retail shelf having the product in response to a query about the product from the user device. In accordance with any preceding example of the apparatus, in one example, including means for sending the video stream of the retail shelf to the user device, including to filter transient changes from the video stream to present a view of the product unobstructed by a realtime transient obstruction of the product on the retail shelf. In accordance with any preceding example of the apparatus, in one example, the video stream comprises video of a shared workspace within a screen image of a user device. In accordance with any preceding example of the apparatus, in one example, the means for identifying the computer vision character comprises means for identifying an identifiable element of a electronic document or cloud-based shared document. In accordance with any preceding example of the apparatus, in one example, the identifiable element of the electronic document or cloud-based shared document comprises a title, a line, a header, a footer, a page number, a user icon, or a paragraph of the shared document, wherein the means for providing the function associated with the vision character comprises means for providing a link to edit the identifiable element within the shared document, means for providing a link to send a message related to the identifiable element, or means for providing a link to navigate within the shared document. In accordance with any preceding example of the apparatus, in one example, including means for sending the video stream to the user device, including means for sending a stream of different views from one or multiple different user devices. In accordance with any preceding example of the apparatus, in one example, including means for sending the video stream to the user device, including means for sending a visual snapshot of the shared workspace, and then updating the content objects based on updates to the content objects since the visual snapshot was taken. In accordance with any preceding example of the apparatus, in one example, the means for identifying the computer vision character comprises means for identifying an identifiable element of a webpage. In accordance with any preceding example of the apparatus, in one example, the identifiable element of the webpage comprises a universal resource locator (URL), an input box, a hyperlink, menu items, actionable drop-downs, buttons, communication icons, messaging icons, or a user icon. In accordance with any preceding example of the apparatus, in one example, providing the function associated with the identifiable element comprises providing a click-through link to the identifiable element. In accordance with any preceding example of the apparatus, in one example, the computer vision processing system is to send the video stream of the shared workspace including to filter from the video stream the screen image or a portion of the screen image that includes sensitive user information.

Flow diagrams as illustrated herein provide examples of sequences of various process actions. The flow diagrams can indicate operations to be executed by a software or firmware routine, as well as physical operations. A flow diagram can illustrate an example of the implementation of states of a finite state machine (FSM), which can be implemented in hardware and/or software. Although shown in a particular sequence or order, unless otherwise specified, the order of the actions can be modified. Thus, the illustrated diagrams should be understood only as examples, and the process can be performed in a different order, and some actions can be performed in parallel. Additionally, one or more actions can be omitted; thus, not all implementations will perform all actions.

To the extent various operations or functions are described herein, they can be described or defined as software code, instructions, configuration, and/or data. The content can be directly executable ("object" or "executable" form), source code, or difference code ("delta" or "patch" code). The software content of what is described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to what is disclosed and implementations of the invention without departing from their scope. Therefore, the illustrations and examples herein should be construed in an illustrative, and not a restrictive sense. The scope of the invention should be measured solely by reference to the claims that follow.

What is claimed is:

1. A system comprising:
a memory to store code to execute a computer vision processing system;
a network interface to receive a video stream from a client device; and
a processor to execute the computer vision processing system, including to
identify in the video stream a computer vision character of a vision alphabet, wherein the vision alphabet includes a collection of computer vision characters, and wherein each computer vision character has a distinctive characteristic identifiable by the computer vision processing system; and
process an image of the video stream to provide to a user device a function associated with the identified computer vision character, the processing including to make a bounded space within the video stream corresponding to the identified computer vision character interactive on the user device, to provide the function in response to interaction with the bounded space at the user device;
wherein the video stream comprises video of a retail shelf, and wherein the identified computer vision character comprises a product on the retail shelf;
wherein the computer vision processing system is to send the video stream of the retail shelf to the user device, including to filter transient changes from the video stream to present a view of the product unobstructed by a realtime transient obstruction of the product on the retail shelf.

2. The system of claim 1, wherein to identify the computer vision character comprises analyze the video stream with a computer vision neural network, wherein the identified computer vision character comprises a first computer vision character, and wherein to analyze the video stream comprises identify a second computer vision character that matches the first computer vision character, and has a different scale;
wherein the computer vision processing system is to link the first computer vision character and the second computer vision character.

3. The system of claim 1, wherein to identify the computer vision character comprises add the identified computer vision character to an index of computer vision characters detected in the video stream or another separate video stream.

4. The system of claim 1, wherein the computer vision processing system is to send the processed image of the video stream to the user device to provide the function associated with the identified computer vision character; or, wherein the computer vision processing system is to send information to the user device based on the processed image of the video stream, to provide the function related to the computer vision character identified in the video stream.

5. The system of claim 1, wherein the computer vision processing system is to send image overlay information to the user device based on the processed image of the video stream, to provide the function associated with the identified computer vision character.

6. The system of claim 1, wherein the user device comprises a personal system or a cloud terminal that a user accesses remotely from a personal system.

7. The system of claim 1, wherein computer vision character comprises a first computer vision character, the product comprises a first product, and further comprising the computer vision processing system to
- identify a second product as a second computer vision character in the video stream; and
- identify the retail shelf as a composite object having the first computer vision character and the second computer vision character.

8. The system of claim 1, wherein to provide the function associated with the product comprises provide a link, including to provide one or more of an embedded link to a page of information about the product, an embedded link to a function to add the product to a virtual shopping cart, or an embedded link to an image object, or a combination of these.

9. The system of claim 1, wherein the computer vision processing system is to send the processed video stream of the retail shelf having the product in response to a user selection from a page of information about the product or in response to a query about the product from the user device.

10. A system comprising:
- a memory to store code to execute a computer vision processing system;
- a network interface to receive a video stream from a client device; and
- a processor to execute the computer vision processing system, including to
  - identify in the video stream a computer vision character of a vision alphabet, wherein the vision alphabet includes a collection of computer vision characters, and wherein each computer vision character has a distinctive characteristic identifiable by the computer vision processing system; and
  - process an image of the video stream to provide to a user device a function associated with the identified computer vision character, the processing including to make a bounded space within the video stream corresponding to the identified computer vision character interactive on the user device, to provide the function in response to interaction with the bounded space at the user device,
- wherein the video stream comprises video of a computer screen workspace, and wherein the computer vision character comprises an identifiable element of the computer screen workspace.

11. The system of claim 10, wherein the identifiable element of the computer screen workspace comprises an identifiable element of an electronic document.

12. The system of claim 11, wherein the identifiable element of the electronic document comprises a title, a line, a header, a footer, a page number, a user icon, a diagram, a table, or a paragraph of the electronic document, wherein to provide the function associated with the vision character comprises provide a link to edit the identifiable element within the electronic document, provide a link to send a message related to the identifiable element, provide a link to a function associated with the identifiable element, or provide a link to navigate within the electronic document.

13. The system of claim 10, wherein the computer vision processing system is to send multiple concurrent streams of different views from one or multiple different user devices to the user device.

14. The system of claim 10, wherein the computer vision processing system is to generate a visual snapshot of the computer screen workspace, and then enable resumption of sharing the computer screen workspace based on the visual snapshot.

15. The system of claim 10, wherein to identify the computer vision character comprises identify an identifiable element of the computer screen workspace, including or more of a universal resource locator (URL), an input box, a hyperlink, menu items, actionable drop-downs, buttons, communication icons, messaging icons, or a user icon.

16. The system of claim 10, wherein to provide the function associated with the identifiable element comprises provide a click-through link to the identifiable element.

17. The system of claim 10, wherein the computer vision processing system is to send the video stream of the computer screen workspace including to filter out or exclude a screen image, a portion of a screen image, or an entire video stream that includes sensitive user information.

18. The system of claim 10, wherein to identify the computer vision character comprises analyze the video stream with a computer vision neural network, wherein the identified computer vision character comprises a first computer vision character, and wherein to analyze the video stream comprises identify a second computer vision character that matches the first computer vision character, and has a different scale;
- wherein the computer vision processing system is to link the first computer vision character and the second computer vision character.

19. The system of claim 10, wherein to identify the computer vision character comprises add the identified computer vision character to an index of computer vision characters detected in the video stream or another separate video stream.

20. The system of claim 10, wherein the computer vision processing system is to send the processed image of the video stream to the user device to provide the function associated with the identified computer vision character; or, wherein the computer vision processing system is to send information to the user device based on the processed image of the video stream, to provide the function related to the computer vision character identified in the video stream.

21. An apparatus comprising a non-transitory computer readable medium having content stored thereon, which when executed, causes a machine to perform operations including:
- identifying in a video stream a computer vision character of a vision alphabet, wherein the vision alphabet includes a collection of computer vision characters, and wherein each computer vision character has a distinctive characteristic identifiable by a computer vision system; and
- processing an image of the video stream to provide to a user device a function associated with the identified computer vision character, the processing including making a bounded space within the video stream corresponding to the identified computer vision character interactive on the user device, to provide the function in response to interaction with the bounded space at the user device;

wherein the video stream comprises video of a computer screen workspace, and wherein the computer vision character comprises an identifiable element of the computer screen workspace.

22. The apparatus of claim 21, wherein identifying the computer vision character comprises adding the identified computer vision character to an index of computer vision characters detected in the video stream or another separate video stream.

23. The apparatus of claim 21, wherein the video stream comprises video of a retail shelf, and wherein the identified computer vision character comprises a product on the retail shelf.

24. The apparatus of claim 23, wherein to provide the function associated with the product comprises provide a link, including to provide one or more of an embedded link to a page of information about the product, an embedded link to a function to add the product to a virtual shopping cart, or an embedded link to an image object, or a combination of these.

25. The apparatus of claim 21, wherein the video stream comprises video of a computer screen workspace, and wherein the computer vision character comprises an identifiable element of the computer screen workspace.

26. The apparatus of claim 25, wherein the identifiable element of the computer screen workspace comprises an identifiable element of an electronic document.

\* \* \* \* \*